US009648273B2

(12) United States Patent
Takai et al.

(10) Patent No.: US 9,648,273 B2
(45) Date of Patent: May 9, 2017

(54) TRANSMISSION SYSTEM FOR TRANSMITTING HIGH-RESOLUTION VIDEO SIGNAL BY PERFORMING MULTI-VALUE TRANSMISSION CHANGING IN AMPLITUDE DIRECTION

(71) Applicant: Panasonic Intellectual Property Management Co., Ltd., Osaka (JP)

(72) Inventors: Yasumichi Takai, Osaka (JP); Tsutomu Niiho, Osaka (JP); Osamu Shibata, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 14/420,421

(22) PCT Filed: Jul. 10, 2013

(86) PCT No.: PCT/JP2013/004273
§ 371 (c)(1),
(2) Date: Feb. 9, 2015

(87) PCT Pub. No.: WO2014/045502
PCT Pub. Date: Mar. 27, 2014

(65) Prior Publication Data
US 2015/0208027 A1 Jul. 23, 2015

(30) Foreign Application Priority Data

Sep. 21, 2012 (JP) ................................. 2012-208739

(51) Int. Cl.
*H04N 7/00* (2011.01)
*H04N 7/025* (2006.01)
(Continued)

(52) U.S. Cl.
CPC .......... *H04N 7/025* (2013.01); *H04L 25/4917* (2013.01); *H04N 5/38* (2013.01); *H04N 5/46* (2013.01); *H04N 7/083* (2013.01)

(58) Field of Classification Search
CPC .......... H04N 7/025; H04N 5/38; H04N 7/083; H04L 25/4917
(Continued)

(56) References Cited

U.S. PATENT DOCUMENTS 6,618,095 B1    9/2003  Takeuchi et al.
6,678,333 B1 *  1/2004  Yamashita .......... H04L 25/4908
                                                            341/50

(Continued)

FOREIGN PATENT DOCUMENTS

JP    08-223229    8/1996
JP    09-258686    10/1997
(Continued)

OTHER PUBLICATIONS

International Preliminary Report on Patentability and Written Opinion of the International Searching Authority issued Apr. 2, 2015 in corresponding International (PCT) Application No. PCT/JP2013/004273.

(Continued)

*Primary Examiner* — Brian Yenke
*Assistant Examiner* — Humam Satti
(74) *Attorney, Agent, or Firm* — Wenderoth, Lind & Ponack, L.L.P.

(57) ABSTRACT

A transmitter apparatus is provided with a first multi-value signal generator to convert the non-video signal of natural number "a"×natural number M bits other than a video signal into a multi-value signal of a multi-value number $2^{aM}$ and to output a resulting signal, a second multi-value signal generator to convert the video signal of natural number "a"×

(Continued)

natural number N bits into a multi-value signal of a multi-value number $2^{aN}$ larger than the multi-value number $2^{aM}$ and to output a resulting signal, and a transmission driver circuit to transmit the multi-value signal of the multi-value number $2^{aM}$ in at least partial time interval of a blanking time interval and to transmit the multi-value signal of the multi-value number $2^{aN}$ in an active time interval.

14 Claims, 16 Drawing Sheets

(51) Int. Cl.
*H04L 25/49* (2006.01)
*H04N 7/083* (2006.01)
*H04N 5/38* (2006.01)
*H04N 5/46* (2006.01)

(58) Field of Classification Search
USPC .................. 348/636, 476–479, 384.1, 387.1
See application file for complete search history.

(56) References Cited

U.S. PATENT DOCUMENTS

| | | | |
|---|---|---|---|
| 6,891,854 B2* | 5/2005 | Zhang | H04N 21/23614 348/384.1 |
| 7,308,058 B2 | 12/2007 | Zerbe et al. | |
| 7,558,326 B1* | 7/2009 | Lyle | H04L 1/0057 348/469 |
| 7,567,588 B2 | 7/2009 | Satoh et al. | |
| 2002/0080280 A1* | 6/2002 | Champion | G09G 5/00 348/584 |
| 2003/0067552 A1* | 4/2003 | Leyvi | G09G 5/005 348/453 |
| 2003/0147005 A1* | 8/2003 | Okamoto | H04L 1/0065 348/473 |
| 2003/0169370 A1* | 9/2003 | Ejima | H04N 21/439 348/484 |
| 2005/0047447 A1 | 3/2005 | Satoh et al. | |
| 2005/0147178 A1* | 7/2005 | Kikuchi | H03M 5/20 375/288 |
| 2007/0172000 A1 | 7/2007 | Hamamoto et al. | |
| 2008/0297511 A1* | 12/2008 | Chou | G09G 5/005 345/428 |
| 2009/0278984 A1* | 11/2009 | Suzuki | G09G 5/003 348/554 |
| 2010/0020831 A1* | 1/2010 | Okamoto | H04N 7/088 370/537 |
| 2014/0232940 A1* | 8/2014 | Nio | H04N 21/43635 348/723 |

FOREIGN PATENT DOCUMENTS

| | | |
|---|---|---|
| JP | 2000-232630 | 8/2000 |
| JP | 2005-102161 | 4/2005 |
| JP | 2007-208319 | 8/2007 |
| JP | 2008-224936 | 9/2008 |
| JP | 2009-186502 | 8/2009 |

OTHER PUBLICATIONS

International Search Report issued Aug. 27, 2013 in corresponding International (PCT) Application No. PCT/JP2013/004273.

* cited by examiner

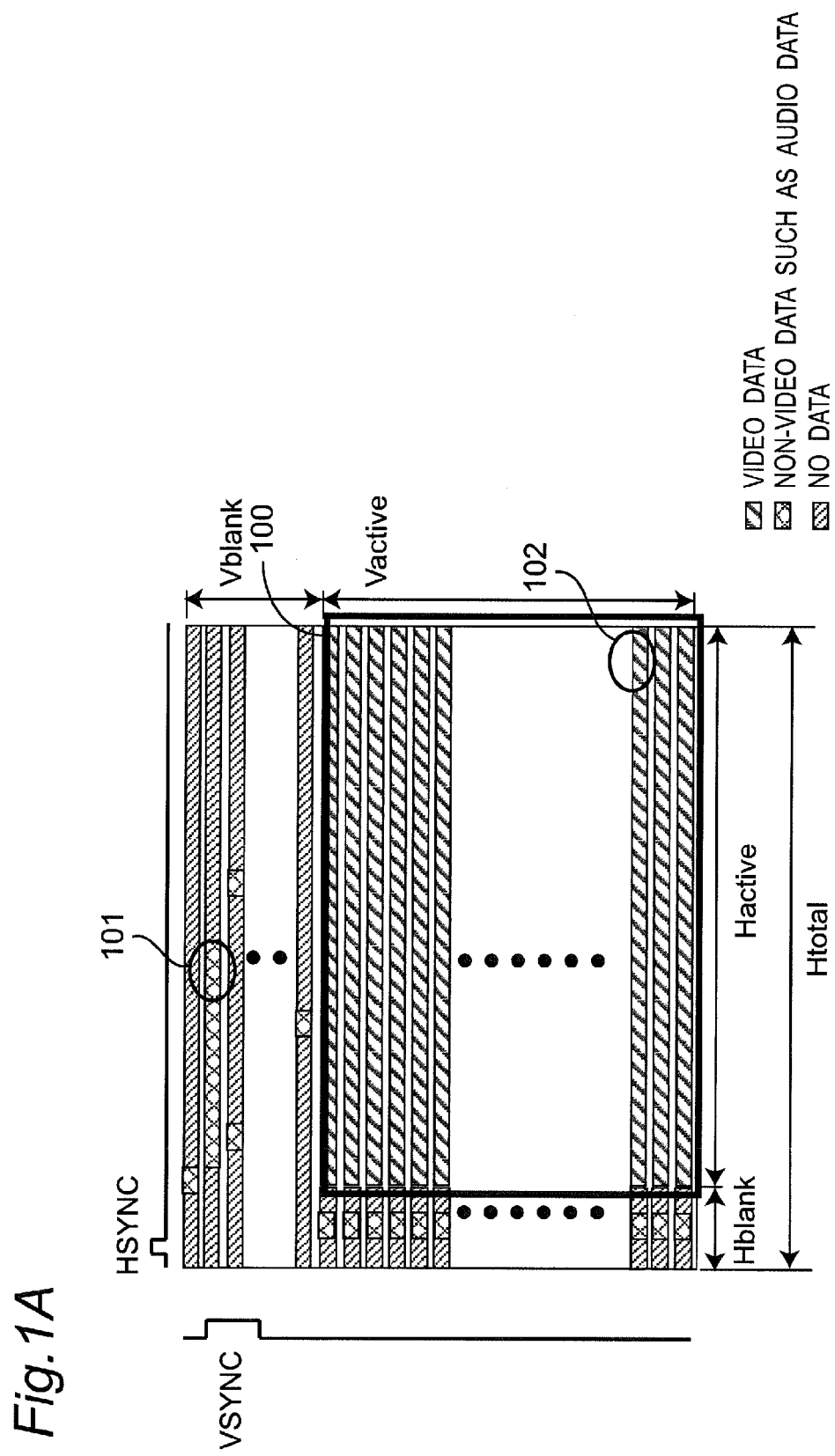

NON-VIDEO DATA SUCH AS AUDIO DATA OR NO DATA

101

IMAGE DATA

102

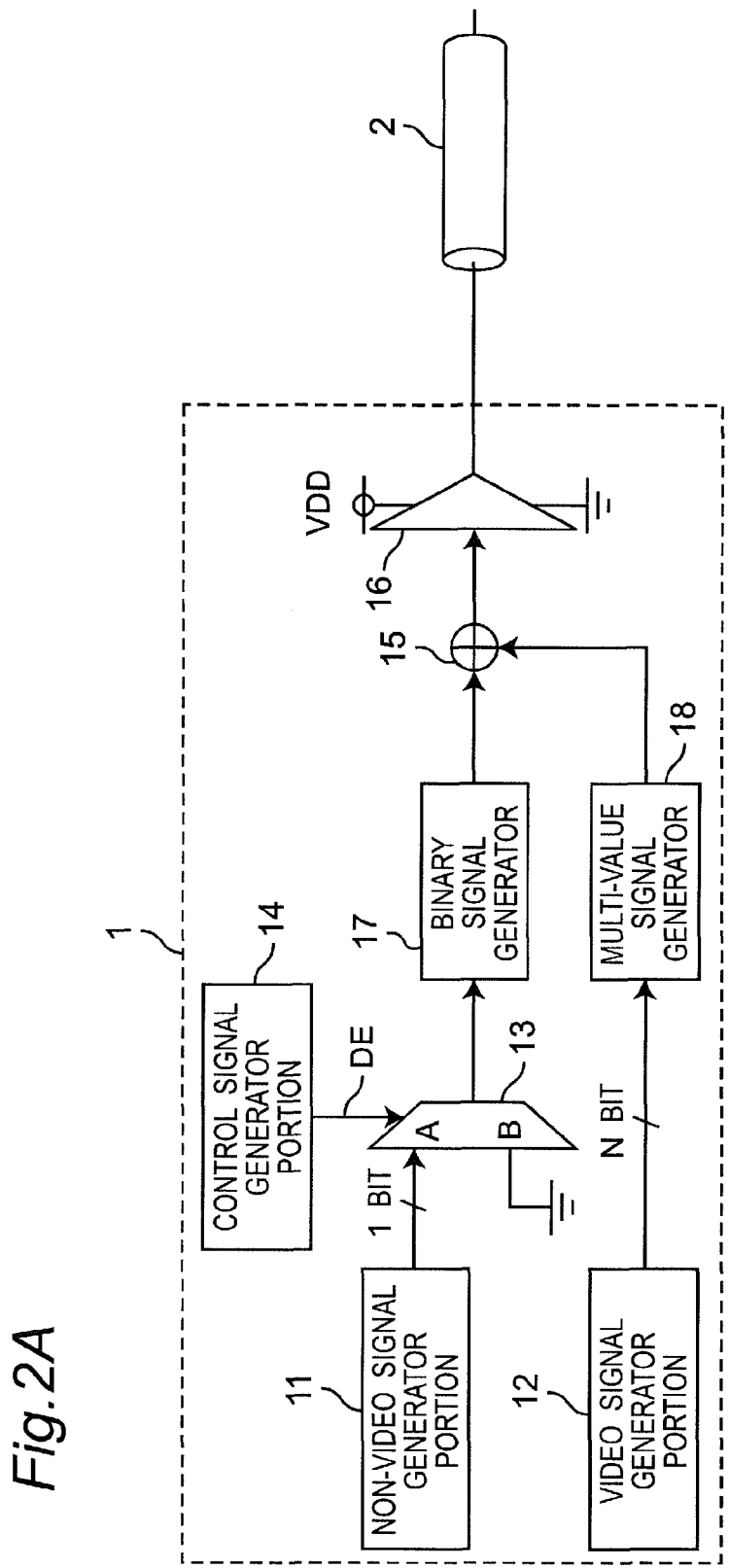

Fig.2D

| INPUT SIGNAL TO LOGIC CIRCUIT 35 | | | OUTPUT SIGNAL FROM LOGIC CIRCUIT 35 | |
|---|---|---|---|---|
| OUTPUT SIGNAL FROM COMPARATOR 32-1 | OUTPUT SIGNAL FROM COMPARATOR 32-2 | OUTPUT SIGNAL FROM COMPARATOR 32-3 | VIDEO SIGNAL (DE=1) | NON-VIDEO SIGNAL (DE=0) |
| 0 | 0 | 0 | 00 | 0 |
| 0 | 0 | 1 | 01 | 0 |
| 0 | 1 | 1 | 10 | 1 |
| 1 | 1 | 1 | 11 | 1 |

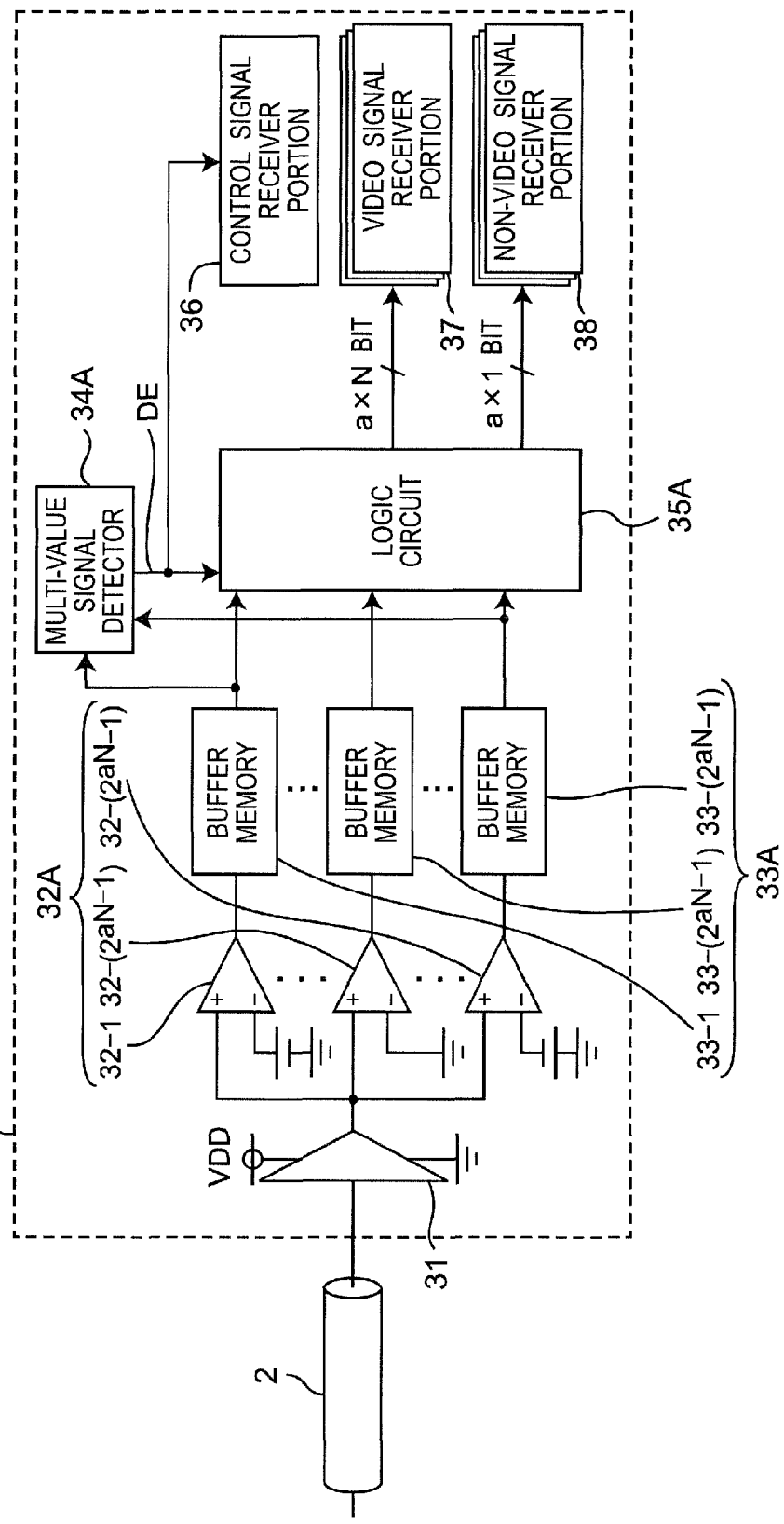

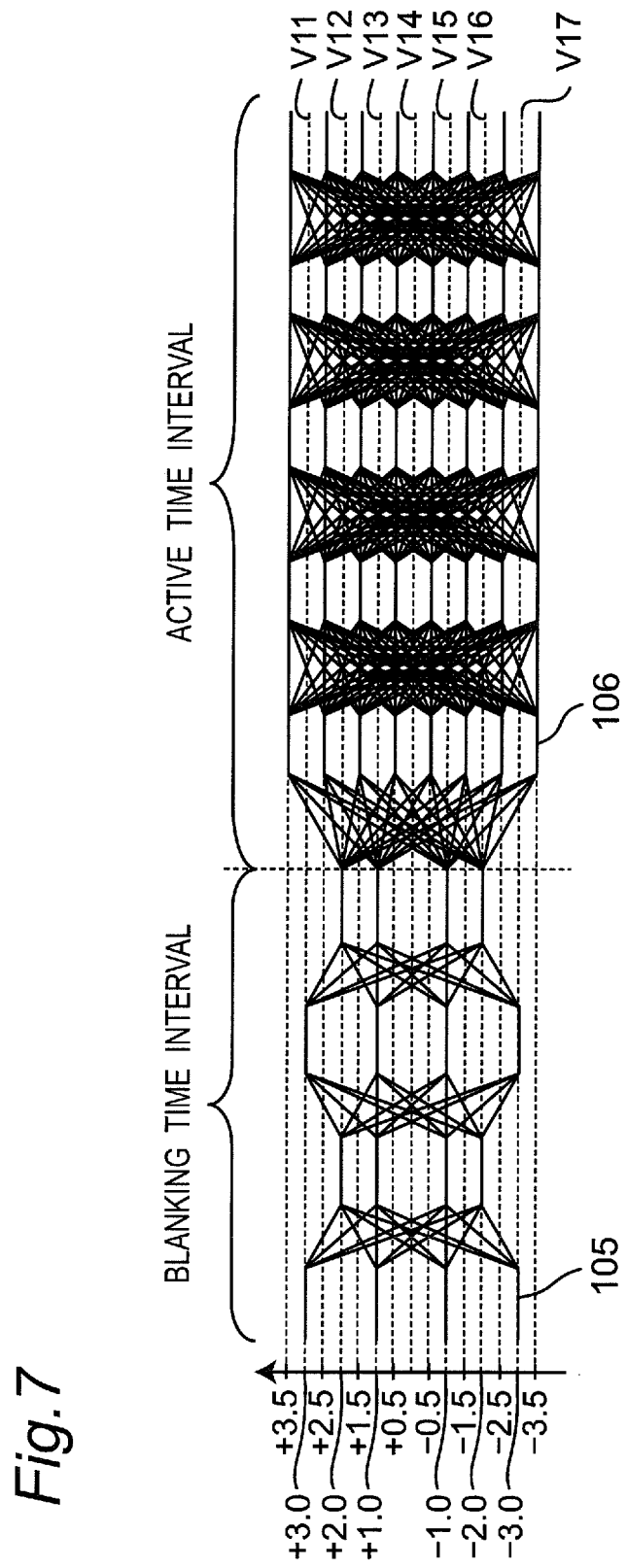

TRANSMISSION SYSTEM FOR TRANSMITTING HIGH-RESOLUTION VIDEO SIGNAL BY PERFORMING MULTI-VALUE TRANSMISSION CHANGING IN AMPLITUDE DIRECTION

TECHNICAL FIELD

The present disclosure is related to a transmitter apparatus, a receiver apparatus and a transmission system, and is related, in particular, to a technology to increase the transmission rate by performing multi-value transmission in the amplitude direction in an active time interval including a video signal when a high-resolution video signal is transmitted.

BACKGROUND

In recent years, video signals have been made to have high bits and high resolution in accordance with improvements in the video image quality, and the amount of data transmitted by a digital interface also increases. A frequency increase is promoted to transmit a large amount of data, and signal transmission becomes difficult due to attenuation and the like in the transmission line under the influence of the increased frequency. In order to avoid this problem, there has been known a video signal compression technique and a multi-value signal transmission system to multiplex data in the voltage direction without frequency increase.

In addition, as a conventional technique to multiplex data in the voltage direction, a multi-value transmission system as described in PATENT LITERATURE 1 can be enumerated. Therefore, bit error is suppressed by changing the multi-value number in accordance with the error rate, and the error rate of the multi-value transmission can be reduced.

CITATION LIST

Patent Literature

PATENT LITERATURE 1: U.S. Pat. No. 7,308,058 B2

SUMMARY OF THE INVENTION

Technical Problem

However, according to the above conventional multi-value transmission system, there has been the problem that the transmission rate is varied by the error rate, failing in steadily transmitting the video frame, and the power consumption of the transmission system has increased by transmitting a multi-value signal also in a blanking time interval, in which a high-speed transmission rate is unnecessary.

An object of the present disclosure is to solve the above problems and provide a transmitter apparatus, a receiver apparatus and a transmission system capable of performing transmission by steadily keeping the video frame rate while suppressing the power consumption of the transmission system and the heat generation of the transmitter and receiver apparatuses in the blanking time interval.

Solution to Problem

According to a transmitter apparatus of the first disclosure, the transmitter apparatus includes a first multi-value signal generator configured to convert the non-video signal of natural number "a"×natural number M bits other than a video signal into a multi-value signal of a multi-value number $2^{aM}$, and to output a resulting signal. In addition, the transmitter apparatus includes a second multi-value signal generator configured to convert the video signal of natural number "a"×natural number N bits into a multi-value signal of a multi-value number $2^{aN}$ larger than the multi-value number $2^{aM}$, and to output a resulting signal. Further, the transmitter apparatus includes a transmission driver circuit configured to transmit the multi-value signal of the multi-value number $2^{aM}$ in at least partial time interval of a blanking time interval, and to transmit the multi-value signal of the multi-value number $2^{aN}$ in an active time interval.

According to a receiver apparatus of the second disclosure, the receiver apparatus includes a multi-value receiver circuit configured to receive a transmission signal transmitted by converting a non-video signal of natural number "a"×natural number M bits other than a video signal into a multi-value signal of a multi-value number $2^{aM}$ in a blanking time interval, to receive a transmission signal transmitted by converting the video signal of natural number "a"×natural number N bits into a multi-value signal of a multi-value number $2^{aN}$ larger than the multi-value number $2^{aM}$ in an active time interval, and to output a received signal as a reception signal. In addition, the receiver apparatus includes a multi-value signal detector configured to determine whether it is a multi-value signal of a multi-value number $2^{aM}$ or a multi-value signal of a multi-value number $2^{aN}$ from the electrical potential level of the reception signal, and to generate a control signal that indicates a determination result. Further, the receiver apparatus includes a logic circuit configured to demodulate the multi-value signal of the multi-value number $2^{aM}$ and the multi-value signal of the multi-value number $2^{aN}$ of the reception signal into the non-video signal of a×M bits and the video signal of a×N bits, respectively, on the basis of the electrical potential level of the reception signal and the control signal, and to output a resulting signals.

According to a transmission system of the third disclosure, the transmission system includes the above transmitter apparatus and the above receiver apparatus.

Advantageous Effects of the Invention

According to the transmitter apparatus, receiver apparatus and transmission system of the present disclosure, it is possible to perform a transmission by the multi-value signal without changing the fundamental frequency by increasing the multi-value number of the transmission signal in the active time interval, and to perform a transmission in the blanking time interval by a multi-value number smaller than the multi-value number in the active time interval. Therefore, it is possible to perform a transmission by steadily keeping the video frame rate while allowing the power consumption of the transmission system to be reduced and the heat generation of the transmitter and receiver apparatuses to be suppressed.

BRIEF DESCRIPTION OF DRAWINGS

FIG. 1A is a diagram showing a frame format at the time of data transmission according to a first embodiment of the present disclosure.

FIG. 2A is a block diagram showing a configuration of a transmitter apparatus 1 of a transmission system that uses a multi-value amplitude modulation system according to the first embodiment of the present disclosure.

FIG. 2D is a table showing a relation between an input signal and an output signal at a logic circuit 35 of FIG. 2C.

FIG. 3B is a block diagram showing a configuration of a receiver apparatus 3A of the transmission system that uses the multi-value amplitude modulation system of the second embodiment of the present disclosure.

FIG. 7 is a transmission waveform chart of a transmission signal of a non-video signal obtained by 4-value conversion and a video signal obtained by 8-value conversion of a transmitter apparatus according to a modified embodiment of the present disclosure.

DESCRIPTION OF EMBODIMENTS

In such a technology that the transmission rate varies depending on the error rate, the present inventors keenly researched a technology regarding transmission of a multi-value signal in order to solve the problems that another frame cannot be steadily transmitted simultaneously with one frame and the power consumption of the transmission system is increased by transmitting the multi-value signal in the blanking time interval, in which high-speed transmission rate is unnecessary. As a result, the present inventors discovered a transmitter apparatus, a receiver apparatus and a transmission system capable of performing transmission by steadily keeping the video frame rate while suppressing the power consumption of the transmission system and the heat generation of the transmitter and receiver apparatuses in the blanking time interval and determining the control signal from only the electrical potential level of the reception signal. Further, the present inventors discovered a transmitter apparatus, a receiver apparatus and a transmission system capable of unerringly following a variation in the electrical potential level of the multi-value signal, determining the electrical potential level of the multi-value signal with high accuracy and performing video signal transmission with a high resolution and a high frame rate.

Embodiments of the present disclosure will be described below with reference to the drawings. It is noted that like components are denoted by the same reference signs.

First Embodiment

FIG. 1A is a diagram showing a frame format at the time of data transmission according to a first embodiment of the present disclosure. In FIG. 1A, HSYNC represents a horizontal synchronization signal, and VSYNC represents a vertical synchronization signal. In addition, Vblank represents the vertical blanking time interval, and Hblank represents the horizontal blanking time interval. The time interval of Vblank or Hblank is the blanking time interval, in which non-video data is transmitted. The non-video data is, for example, audio data and/or control data. Further, Vactive represents a time interval other than the above vertical blanking time interval, and Hactive represents a time interval other than the above horizontal blanking time interval. The time interval of Vactive and Hactive is the active time interval, in which video data is transmitted.

Figure 1B:
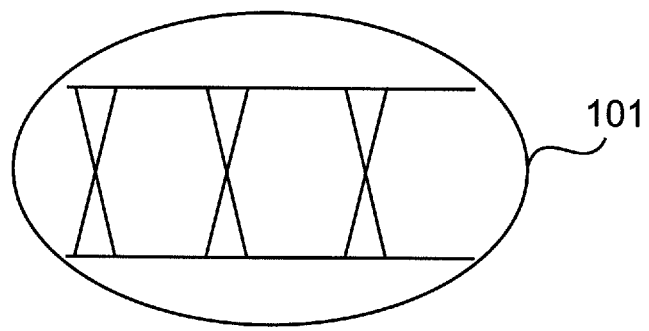
FIG. 1B is a waveform chart showing a binary value transmission signal 101 in a blanking time interval of FIG. 1A.
Figure 1C:
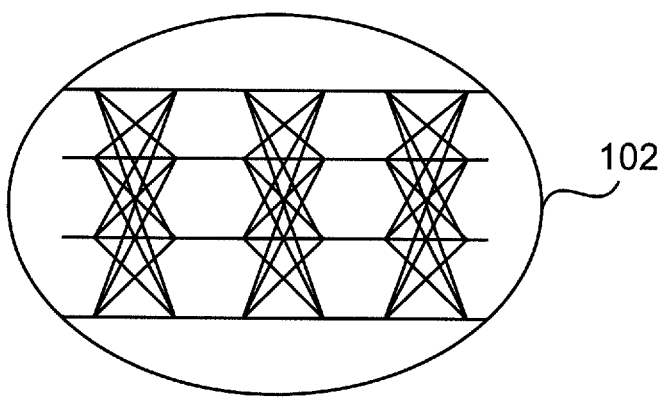
FIG. 1C is a waveform chart showing a 4-value transmission signal 102 in an active time interval of FIG. 1A.

FIG. 1B is a waveform chart showing a binary value transmission signal 101 (FIG. 1A) in a blanking time interval of FIG. 1A, and FIG. 1C is a waveform chart showing a 4-value transmission signal 102 (FIG. 1A) in an active time interval of FIG. 1A.

In FIG. 1A, operation at the time of data transmission in the frame format is described. In the frame format, there are two time intervals of an active time interval 100 including only the video data and a blanking time interval including the data of audio data and the like other than the video data. The amount of data transmitted in the active time interval, in which the video data is consistently transmitted, is larger than the amount of data transmitted in the blanking time interval. In addition, as shown in FIG. 1B and FIG. 1C, a binary signal, which is obtained by converting the non-video data including the audio signal and so on into binary values in the amplitude direction, is transmitted in the blanking time interval, and a 4-value signal, which is obtained by converting the video signal into four values in the amplitude direction, is transmitted in the active time interval 100, and therefore, it is possible to perform a transmission by using a multi-value signal in a transmission line 2 without changing the fundamental frequency.

FIG. 2A is a block diagram showing a configuration of a transmitter apparatus 1 of a transmission system that uses a multi-value amplitude modulation system according to the first embodiment of the present disclosure.

In FIG. 2A, the transmitter apparatus 1 is configured to include a non-video signal generator portion 11, a video signal generator portion 12, a control signal generator portion 14, a selector 13, a binary signal generator 17, a multi-value signal generator 18, an adder 15, and a transmission driver circuit 16.

In FIG. 2A, the non-video signal generator portion 11 generates a signal (auxiliary signal including audio signal and so on) that contains no 1-bit video signal, and outputs the signal to the selector 13. The video signal generator portion 12 generates a video signal that is parallel data of a plurality of N bits, and outputs the signal to the multi-value signal generator 18. The control signal generator portion 14 generates a control signal DE indicating one of the blanking time interval and the active time interval on the basis of the inputted video signal, and outputs the control signal to the selector 13. In this case, the control signal generator portion 14 generates a control signal DE of "0" and outputs the signal to the selector 13 in the blanking time interval, or generates a control signal DE of "1" and outputs the signal to the selector 13 in the active time interval.

The selector 13 selects one of the non-video signal inputted from the non-video signal generator portion 11 and the "0" signal indicating "0" on the basis of the control signal DE inputted from the control signal generator portion 14, and outputs the selected signal to the binary signal generator 17. In this case, the selector 13 outputs the "0" signal to the binary signal generator 17 in the case of the control signal DE of "1", or outputs the non-video signal to the binary signal generator 17 in the case of the control signal DE of "0". Next, the binary signal generator 17 converts the 1-bit non-video signal inputted from the selector 13 into a binary signal, and outputs the signal to the adder 15. In this case, the binary signal has an electrical potential level of one of +1.0 V and −1.0 V. In addition, for example, in the case where N=2, the multi-value signal generator 18 converts the video signal inputted from the video signal generator portion 12 into a 4-value signal, and outputs the signal to the adder 15. In this case, the 4-value signal has an electrical potential level of any of +1.5 V, +0.5 V, −0.5 V and −1.5 V. Further, the adder 15 adds the binary signal inputted from the binary signal generator 17 and the 4-value signal inputted from the multi-value signal generator 18, and outputs the signal of the addition result to the transmission driver circuit 16. The transmission driver circuit 16 performs buffer-amplification of the signal of the addition result without changing the amplitude level of the signal of the addition result, and outputs the signal as a transmission signal to the transmission line 2.

Figure 2B:
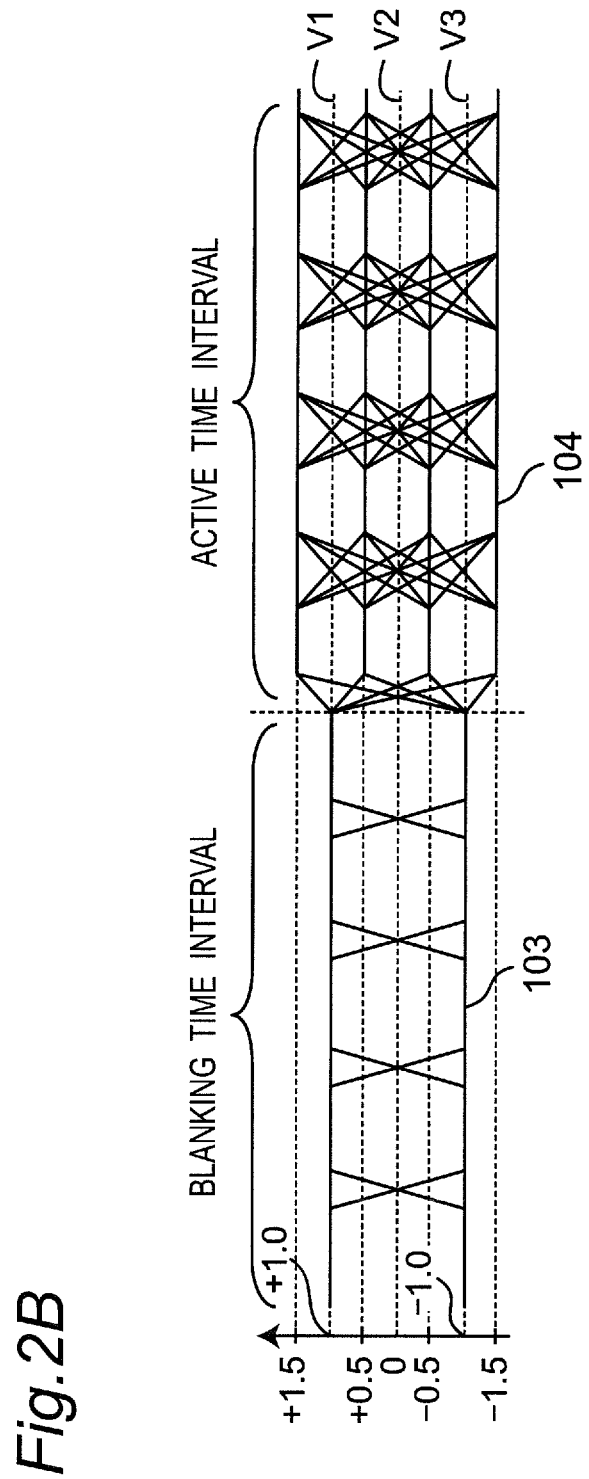
FIG. 2B is a transmission waveform chart of the non-video signal converted into a binary signal and a video signal converted into a 4-value signal in the transmission system of the first embodiment of the present disclosure.

FIG. 2B is a transmission waveform chart of the non-video signal converted into a binary signal and a video signal converted into a 4-value signal in the transmission system of the first embodiment of the present disclosure. In this case, the transmitter apparatus 1 transmits a binary signal 103 of which the electrical potential level of the transmission signal is +1.0 V or −1.0 V in the blanking time interval, and transmits a 4-value signal 104 of which the electrical potential level of the transmission signal is +1.5 V, +0.5 V, −0.5 V or −1.5 V in the active time interval. In this case, the electrical potential levels of +1.0 V and −1.0 V of the binary signal 103 are set to be identical to threshold levels V1 and V3 other than the threshold level V2 of 0 V of the 4-value signal 104 in the binary signal generator 17, and the electrical potential level of the 4-value signal 104 is discriminated by using these threshold levels V1, V2 and V3.

Figure 2C:
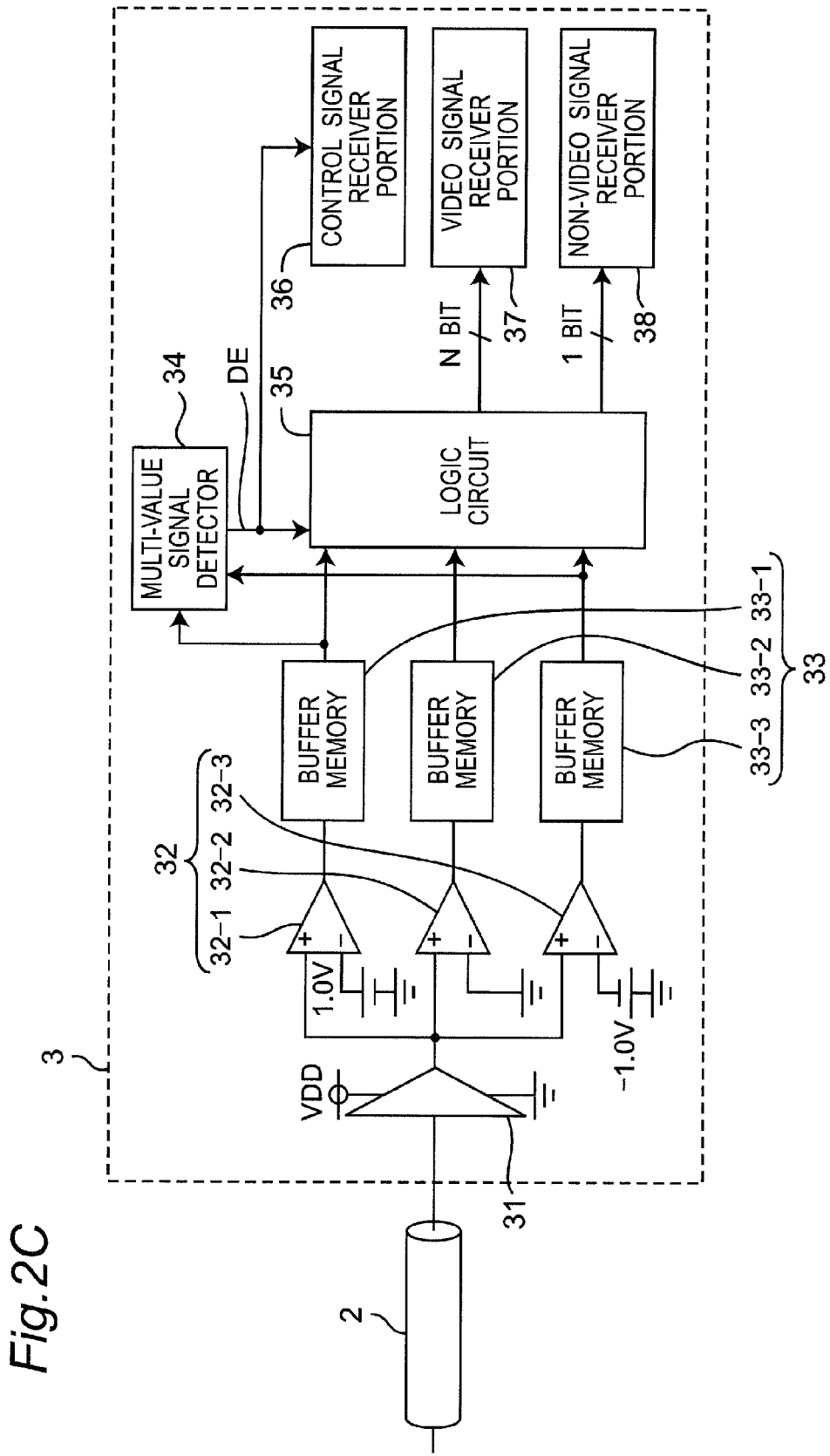
FIG. 2C is a block diagram showing a configuration of a receiver apparatus 3 of a transmission system that uses a multi-value amplitude modulation system according to the first embodiment of the present disclosure.

FIG. 2C is a block diagram showing a configuration of a receiver apparatus 3 of a transmission system that uses a multi-value amplitude modulation system according to the first embodiment of the present disclosure. In FIG. 2C, the receiver apparatus 3 is configured to include a multi-value receiver circuit 31, a comparator circuit 32, a buffer memory circuit 33, a multi-value signal detector 34, a logic circuit 35, a control signal receiver portion 36, a video signal receiver portion 37, and a non-video signal receiver portion 38. Further, the comparator circuit 32 is configured to include a comparator 32-1 that has a first threshold level V1=+1.0 V, a comparator 32-2 that has a second threshold level V2=0 V, and a comparator 32-3 that has a third threshold level V3=−1.0 V. The buffer memory circuit 33 is configured to include buffer memories 33-1, 33-2 and 33-3 connected in correspondence with the comparators 32-1, 32-2 and 32-3, respectively.

In FIG. 2C, the multi-value receiver circuit 31 receives a transmission signal from the transmission line 2, performs buffer-amplification of the signal without changing the amplitude level of the transmission signal, and outputs a resulting signal as a reception signal to each of the comparators 32-1, 32-2 and 32-3. Each of the comparators 32-1, 32-2 and 32-3 receives the reception signal from the multi-value receiver circuit 31, compares the electrical potential level of the reception signal with the threshold levels of +1.0 V, 0 V and −1.0 V of the comparators 32-1, 32-2 and 32-3, respectively, and output signals of the comparison results to the buffer memories 33-1, 33-2 and 33-3, respectively. Each of the buffer memories 33-1, 33-2 and 33-3 temporarily store the signals of the comparison results inputted from each of the comparators 32-1, 32-2 and 32-3, and output the signals of the comparison results to the logic circuit 35, respectively. In addition, the buffer memories 33-1, 33-2 and 33-3 output only the signals stored in the buffer memories 33-1 and 33-3 of the signals of the comparison results inputted from the comparators 32-1, 32-2 and 32-3 to the multi-value signal detector 34.

The multi-value signal detector 34 receives an input of the signals stored in the buffer memories 33-1 and 33-3 for a predetermined time interval of, for example, one horizontal time interval from the buffer memories 33-1 and 33-3, and determines whether it is a binary signal or a 4-value signal from the electrical potential level of the reception signal. The multi-value signal detector 34 generates a control signal DE indicating the determination result, and outputs the control signal DE to the logic circuit 35 and the control signal receiver portion 36. In this case, it is assumed that the electrical potential level of the binary signal becomes, for example, $(1.0-\alpha)$ V such as +0.9 V (in this case, for example, $0<\alpha<0.2$) slightly lowered from +1.0 V and the electrical potential level of the binary signal becomes, for example, $(-1.0+\alpha)$ V such as −0.9 V (in this case, for example, $0<\alpha<0.2$) slightly lowered from the absolute value of −1.0 V in consideration of a transmission loss in the transmission line 2. In the predetermined time interval of, for example, one horizontal time interval, the multi-value signal detector 34 outputs a control signal DE of "1" as a consequence of determining that the reception signal is the 4-value signal in case that there is a reception signal such that the signal from the buffer memory 33-1 is "1" and the signal from the buffer memory 33-3 is "0", or outputs a control signal DE of "0" as a consequence of determining that the reception signal is the binary signal in the other case.

The logic circuit 35 demodulates the binary signal of the reception signal into a 1-bit non-video signal in the blanking time interval from the signals of the comparison results from the comparator circuit 32 temporarily stored in the buffer memory circuit 33 on the basis of the control signal DE from the multi-value signal detector 34, demodulates the 4-value signal of the reception signal into a 2-bit video signal in the active time interval, and outputs the demodulated 1-bit non-video signal and the demodulated 2-bit video signal to the video signal receiver portion 37 and the non-video signal receiver portion 38.

FIG. 2D is a table showing a relation between an input signal and an output signal at a logic circuit 35 of FIG. 2C. In this case, when the control signal DE of "1" is inputted from the multi-value signal detector 34, the signal is demodulated to a video signal of N bits (N=2 in the present embodiment) by the logic circuit 35 and outputted to the video signal receiver portion 37. In detail, as shown in FIG. 2D, the signal is demodulated to a video signal of "00" when the output signals outputted from the comparators 32-1, 32-2 and 32-3 are all "0" or demodulated to a video signal of "01" when the output signals outputted from the comparators 32-1 and 32-2 are all "0" and the output signal outputted from the comparator 32-3 is "1". The signal is demodulated to a video signal of "10" when the output signal outputted from the comparator 32-1 is "0" and the output signals outputted from the comparators 32-2 and 32-3 are "1" or demodulated to a video signal of "11" when the output signals outputted from the comparators 32-1, 32-2 and 32-3 are all "1".

In addition, when the control signal DE of "0" is inputted from the multi-value signal detector 34, it is demodulated to a 1-bit non-video signal by the logic circuit 35 and outputted to the non-video signal receiver portion 38. In detail, as shown in FIG. 2D, it is demodulated to a non-video signal of "0" when the output signal outputted from the comparator 32-2 is "0" or demodulated to a non-video signal of "1" when the output signal outputted from the comparator 32-2 is "1".

The operational effects of the transmission system including the transmitter apparatus 1, the transmission line 2, and the receiver apparatus 3, as configured above, are described as follows.

The transmission system of the present embodiment is characterized in that the multi-value number of the transmission signal is selectively switched over on the basis of the control signal DE in the blanking time interval and the active time interval. Concretely, in the transmitter apparatus 1, the non-video signal is transmitted by being converted into a binary signal in the blanking time interval, and the video signal is transmitted by being converted into a 4-value signal in the active time interval. On the other hand, the receiver apparatus 3 determines the control signal DE from the electrical potential level of the reception signal, and demodulates the signal into a 2-bit video signal and a 1-bit non-video signal on the basis of the control signal DE and the electrical potential level of the reception signal.

According to the transmission system of the above embodiment, it is possible to perform a transmission by using the multi-value signal without changing the fundamental frequency by transmitting a 4-value signal in the active time interval, and to perform a transmission of the binary signal in the blanking time interval. Therefore, it is possible to reduce the power consumption of the transmission system and suppress the heat generation of the transmitter and receiver apparatuses as compared with the conventional transmission system. Further, determination of the active time interval and the blanking time interval can be made by only the multi-value number of the transmission signal, and therefore, it is possible to eliminate the demodulator circuit as compared with the conventional transmission system. In addition, it is possible to perform steady transmission without changing the fundamental frequency by superimposing non-video signals and video signals of a plurality "a" of frames at a time.

In addition, according to the transmission system of the present embodiment, the transmitter apparatus 1 performs setting so that the electrical potential level of the transmission signal in the blanking time interval becomes identical to the threshold level to discriminate the electrical potential level of the transmission signal in the active time interval. Therefore, it is enabled to unerringly follow the electrical potential level of the multi-value signal that varies due to differences in the voltage level and the reference voltage between the transmitter apparatus and the receiver apparatus, a temperature change, a loss in the transmission line and so on and to determine the electrical potential level of the multi-value signal with high accuracy, and therefore, it is possible to accurately perform data reception of the multi-value signal in the active time interval.

Figure 2E:
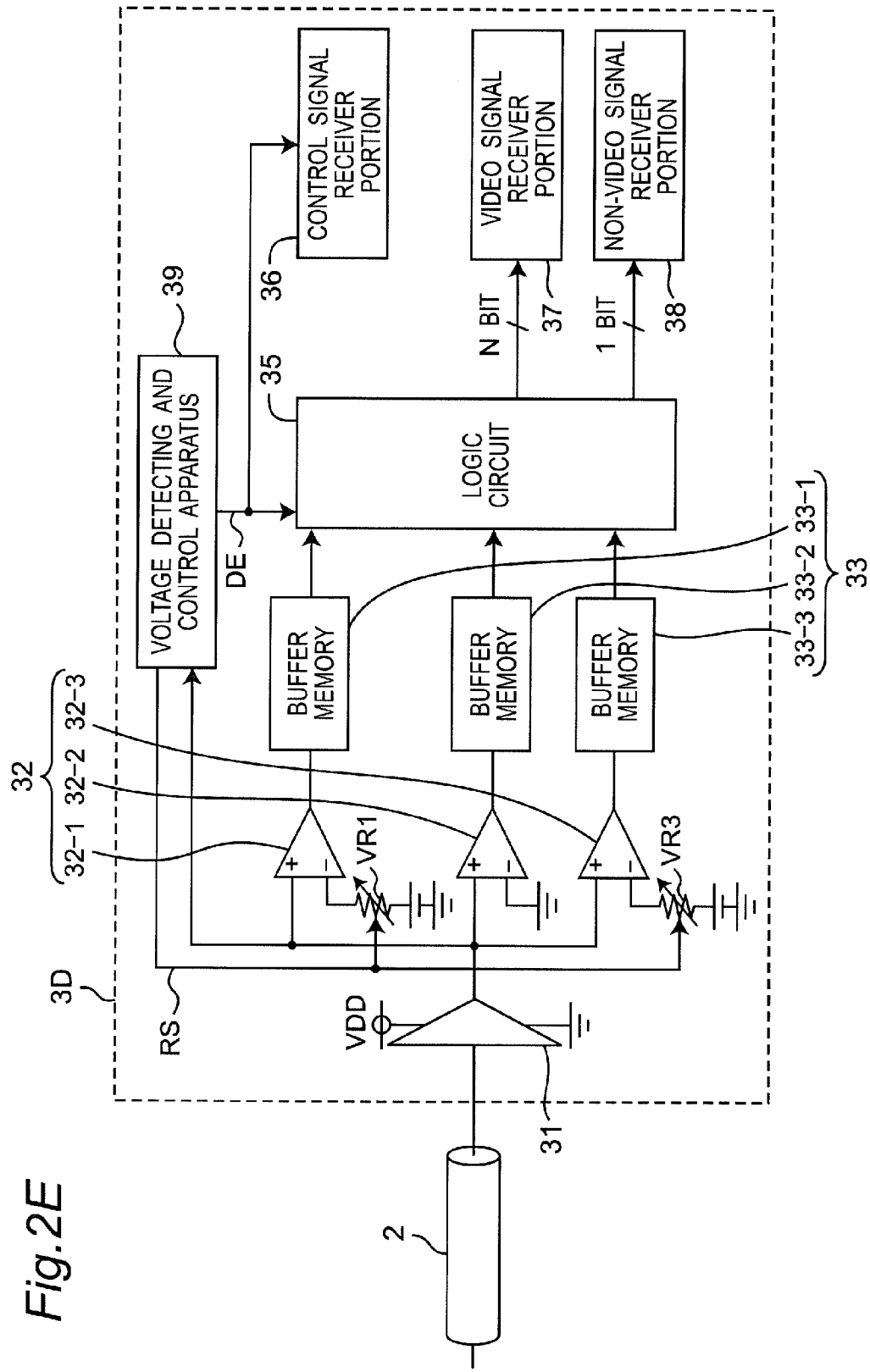
FIG. 2E is a block diagram showing a configuration of a receiver apparatus 3D of a transmission system that uses a multi-value amplitude modulation system according to a modified embodiment of the first embodiment of the present disclosure.

FIG. 2E is a block diagram showing a configuration of a receiver apparatus 3D of a transmission system that uses a multi-value amplitude modulation system according to a modified embodiment of the first embodiment of the present disclosure. As compared with the receiver apparatus 3 shown in FIG. 2C, the receiver apparatus 3D shown in FIG. 2E is characterized in that a voltage detecting and control apparatus 39 is provided in place of the multi-value signal detector 34 and variable resistors VR1 and VR3 connected in series with a voltage source are further provided.

In FIG. 2E, the voltage detecting and control apparatus 39 receives a reception signal from the multi-value receiver circuit 31, determines whether it is a binary signal or a 4-value signal from the electrical potential level of the reception signal, generates a control signal DE that indicates the determination result, and outputs the signal to a logic circuit 35 and a control signal receiver portion 36. In addition, when receiving the binary signal from the multi-value receiver circuit 31, the voltage detecting and control apparatus 39 detects a first detection voltage that has a value slightly lowered from +1.0 V and a second detection voltage that has a value slightly lowered from the absolute value of −1.0 V from the electrical potential level of the binary signal in consideration of, for example, a transmission loss at the transmission line 2. Further, when detecting the 4-value signal from the multi-value receiver circuit 31, the voltage detecting and control apparatus 39 performs setting so that the voltage applied to the inverted input terminal of the comparator 32-1 becomes a voltage identical to the first detection voltage by generating a threshold level setting signal RS that indicates the first detection voltage and changing the resistance value of the variable resistor VR1 while performing setting so that the voltage applied to the inverted input terminal of the comparator 32-3 becomes a voltage identical to the second detection voltage by generating a threshold level setting signal RS that indicates the second detection voltage and changing the resistance value of the variable resistor VR3.

The transmission system including the transmitter apparatus 1, the transmission line 2, and the receiver apparatus 3D, as configured above, has the same operational effects as those of the transmission system of the first embodiment.

Second Embodiment

Figure 3A:
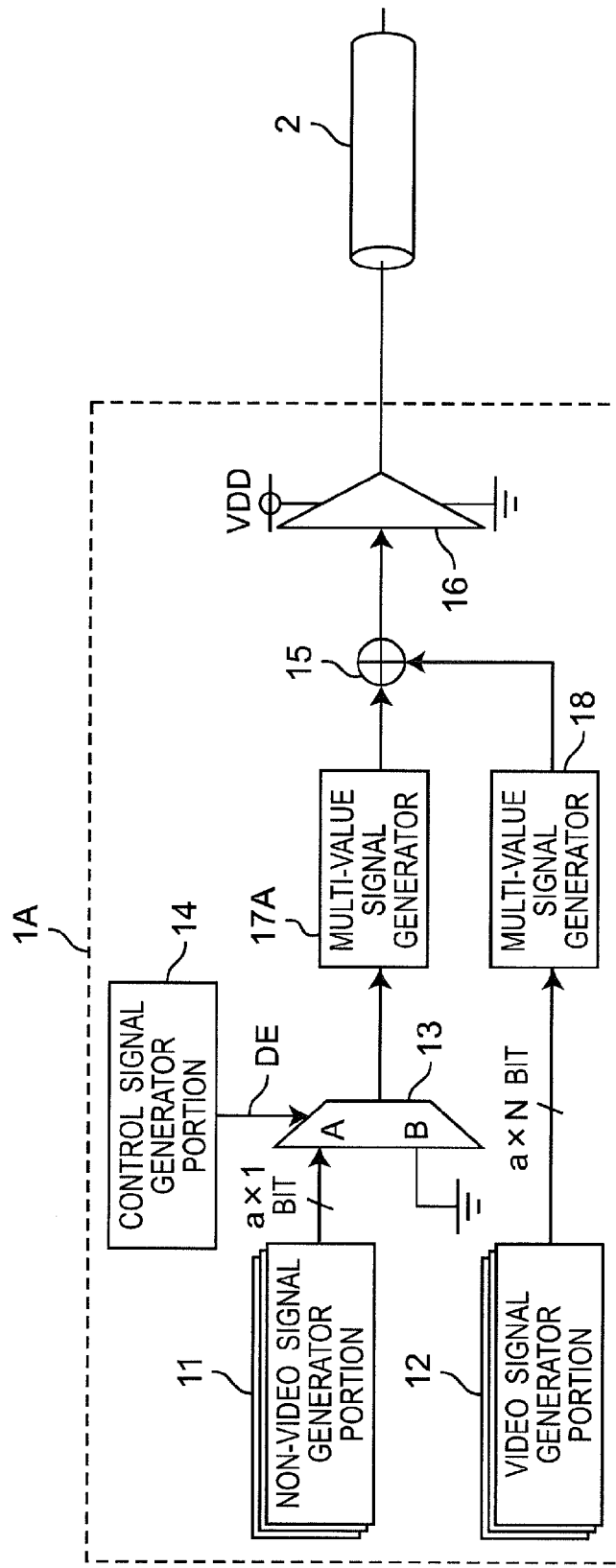
FIG. 3A is a block diagram showing a configuration of a transmitter apparatus 1A of a transmission system that uses a multi-value amplitude modulation system according to a second embodiment of the present disclosure.

FIG. 3A is a block diagram showing a configuration of a transmitter apparatus 1A of a transmission system that uses a multi-value amplitude modulation system according to a second embodiment of the present disclosure. The transmitter apparatus 1A of the second embodiment shown in FIG. 3A differs from the transmitter apparatus 1 of the first embodiment shown in FIG. 2A in the following matters.

(1) Although the non-video signal generator portion 11 has generated the 1-bit non-video signal in FIG. 2A, a non-video signal of a×1 bits is generated in FIG. 3A. In this case, "a" is a plural number, and this holds true hereinbelow. It is noted that the case where "a" is 1 is the above first embodiment.

(2) Although the video signal generator portion 12 has generated the video signal of the plurality of N bits in FIG. 2A, a video signal of a×N bits is generated in FIG. 3A.

(3) A multi-value signal generator 17A of FIG. 3A is provided in place of the binary signal generator 17 of FIG. 2A.

Therefore, the transmitter apparatus 1A of the second embodiment is characterized in that non-video signals and video signals of a plurality "a" of frames are transmitted in superimposition at a time.

In FIG. 3A, the multi-value signal generator 17A converts a non-video signal of a×1 bits inputted from the selector 13 into a multi-value signal of a multi-value number $2^a$, and outputs the multi-value signal of the multi-value number $2^a$ to the adder 15. In addition, the multi-value signal generator 18 converts a video signal of a×N bits inputted from the video signal generator portion 12 into a multi-value signal of a multi-value number $2^{aN}$, and outputs the multi-value signal of the multi-value number $2^{aN}$ to the adder 15. The other configurations are similar to those of the first embodiment.

FIG. 3B is a block diagram showing a configuration of a receiver apparatus 3A of the transmission system that uses the multi-value amplitude modulation system of the second embodiment of the present disclosure. The receiver apparatus 3A of the second embodiment shown in FIG. 3B differs from the receiver apparatus 3A of the first embodiment shown in FIG. 2C in the following points.

(1) A comparator circuit 32A of FIG. 3B is provided in place of the comparator circuit 32 of FIG. 2C. In this case, the comparator circuit 32A is configured to include ($2^{aN}$-1) comparators including a comparator 32-1 that has a first threshold level, . . . , a comparator 32-($2^{aN-1}$) that has a ($2^{aN-1}$)-th threshold level, . . . , and a comparator 32-($2^{aN}$-1) that has a ($2^{aN}$-1)-th threshold level. It is noted that the ($2^{aN-1}$)-th threshold level of the comparator 32-($2^{aN-1}$) in the intermediate position is set to 0 V.

(2) A buffer memory circuit 33A of FIG. 3B is provided in place of the buffer memory circuit 33 of FIG. 2C. In this case, the buffer memory circuit 33A is configured to include ($2^{aN}$-1) buffer memories including buffer memories 33-1, . . . , 33-($2^{aN-1}$), . . . , 33-($2^{aN}$-1) connected in correspondence with the comparators 32-1, . . . , 32-($2^{aN-1}$), . . . , and 32-($2^{aN}$-1), respectively.

(3) A multi-value signal detector 34A of FIG. 3B is provided in place of the multi-value signal detector 34 of FIG. 2C.

(4) A logic circuit 35A of FIG. 3B is provided in place of the logic circuit 35 of FIG. 2C.

In FIG. 3B, the multi-value receiver circuit 31 receives a transmission signal from the transmission line 2, performs buffer-amplification without changing the amplitude level of the transmission signal, and outputs a resulting signal as a reception signal to the comparators 32-1, . . . , 32-($2^{aN-1}$), . . . , 32-($2^{aN}$-1). The comparators 32-1, . . . , 32-($2^{aN-1}$), . . . , 32-($2^{aN}$-1) receive an input of the reception signal from the multi-value receiver circuit 31, compare the electrical potential level of the reception signal with the threshold levels of the comparators 32-1, . . . , 32-($2^{aN-1}$), . . . , 32-($2^{aN}$-1), and output the signals of the comparison results to the buffer memories 33-1, . . . , 33-($2^{aN-1}$), 33-($2^{aN}$-1). The buffer memories 33-1, . . . , 33-($2^{aN-1}$), 33-($2^{aN}$-1) temporarily store the signals of the comparison results inputted from the comparators 32-1, . . . , 32-($2^{aN-1}$), . . . , 32-($2^{aN}$-1), and output the signals of the comparison results to the logic circuit 35A. In addition, the buffer memories 33-1, . . . , 33-($2^{aN-1}$), . . . , 33-($2^{aN}$-1) output only the signals stored in the buffer memories 33-1 and 33-($2^{aN}$-1) of the signals of the comparison results inputted from the comparators 32-1, . . . , 32-($2^{aN-1}$), . . . , 32-($2^{aN}$-1) to the multi-value signal detector 34A.

The multi-value signal detector 34A receives an input of the signals stored in the buffer memories 33-1 and 33-($2^{aN}$-1) for a predetermined time interval of, for example, one horizontal time interval from the buffer memories 33-1 and 33-($2^{aN}$-1), determines whether it is the multi-value signal of the multi-value number $2^a$ or the multi-value signal of the multi-value number $2^{aN}$ from the electrical potential level of the reception signal, generates a control signal DE that indicates the determination result, and outputs the signal to the logic circuit 35A and the control signal receiver portion 36. In this case, it is assumed that the maximum electrical potential level is slightly lowered and the absolute value of the minimum electrical potential level is slightly lowered in regard of the electrical potential level of the multi-value signal of the multi-value number $2^a$ in consideration of a transmission loss in the transmission line 2. In a predetermined time interval of, for example, one horizontal time interval, the multi-value signal detector 34 outputs a control signal DE of "1" as a consequence of determining that the reception signal is the multi-value signal of the multi-value number $2^{aN}$ in case that there is a reception signal such that the signal from the buffer memory 33-1 is "1" and the signal from the buffer memory 33-($2^{aN}$-1) is "0", or outputs a control signal DE of "0" as a consequence of determining that the reception signal is the multi-value signal of the multi-value number $2^a$ in the other case.

The logic circuit 35A demodulates the multi-value signal of the multi-value number $2^a$ of the reception signal into a non-video signal of a×1 bits in the blanking time interval or demodulates the multi-value signal of the multi-value number $2^{aN}$ of the reception signal into a video signal of a×N bits in the active time interval from the signals of the comparison results from the comparator circuit 32A temporarily stored in the buffer memory circuit 33A on the basis of the control signal DE inputted from the multi-value signal detector 34A. The demodulated non-video signal of a×1 bits and the demodulated video signal of a×N bits are outputted to the video signal receiver portion 37 and the non-video signal receiver portion 38.

The operational effects of the transmission system including the transmitter apparatus 1A, the transmission line 2, and the receiver apparatus 3A, as configured above, are described as follows.

Regarding the transmission system of the present embodiment, to simultaneously transmit the video signal and the non-video signal of a plurality "a" of frames, in the transmitter apparatus 1A, the non-video signal is transmitted by being converted into the multi-value signal of the multi-value number $2^a$ in the blanking time interval, and the video signal is transmitted by being converted into the multi-value signal of the multi-value number $2^{aN}$ in the active time interval. On the other hand, in the receiver apparatus 3A, the control signal DE is determined from the electrical potential level of the reception signal, and demodulation into the video signal of a×N bits and the non-video signal of a×1 bits is performed on the basis of the control signal DE and the electrical potential level of the reception signal. The other operational effects are similar to those of the first embodiment.

According to the transmission system of the above embodiment, it is possible to perform a transmission by using the large multi-value signal without changing the fundamental frequency by transmitting the multi-value signal of the multi-value number $2^{aN}$ in the active time interval, and to perform a transmission of the multi-value signal of the multi-value number $2^a$ in the blanking time interval. Therefore, it is possible to reduce the power consumption of the transmission system and suppress the heat generation of the transmitter and receiver apparatuses as compared with the conventional transmission system. Further, determination of the active time interval and the blanking time interval can be made only by the multi-value number of the transmission signal, and therefore, it is possible to eliminate the demodulator circuit as compared with the conventional transmission system.

In addition, according to the transmission system of the present embodiment, data processing in units of bits becomes possible by superimposing the video signal and the non-video signal of "a" frames, and therefore, it is possible to simultaneously transmit and receive the video signal and the non-video signal of a plurality of frames at a time without changing the frame format of FIG. 1. In addition, if the transmission signal is transmitted by using the multi-value signal of the multi-value number $2^{4N}$ at the time of Full HD transmission, it is possible to perform 4K2K transmission with the same frame format and the same transmission rate.

Figure 3C:
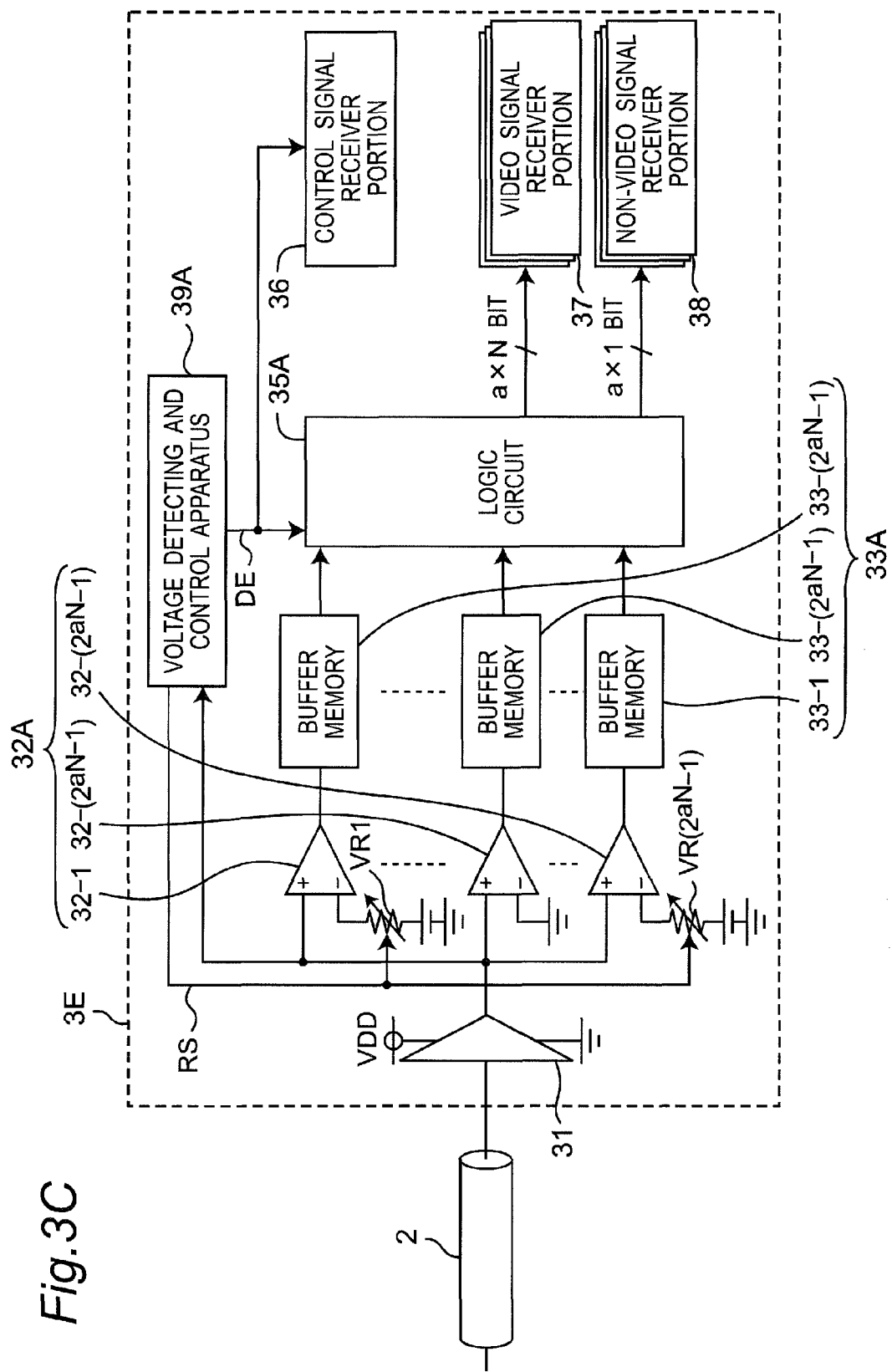
FIG. 3C is a block diagram showing a configuration of a receiver apparatus 3E of a transmission system that uses a multi-value amplitude modulation system according to a modified embodiment of the second embodiment of the present disclosure.

FIG. 3C is a block diagram showing a configuration of a receiver apparatus 3E of a transmission system that uses a multi-value amplitude modulation system according to a modified embodiment of the second embodiment of the present disclosure. As compared with the receiver apparatus 3A shown in FIG. 3B, the receiver apparatus 3E shown in FIG. 3C is characterized in that a voltage detecting and control apparatus 39A is provided in place of the multi-value signal detector 34A, and variable resistors VR1, . . . , VR($2^{aN}$-1), each of which is connected in series with a voltage source, are further provided.

In FIG. 3C, the voltage detecting and control apparatus 39A receives a reception signal from the multi-value receiver circuit 31, determines whether it is the multi-value signal of the multi-value number $2^a$ or the multi-value signal of the multi-value number $2^{aN}$ from the electrical potential level of the reception signal, generates a control signal DE that indicates the determination result, and outputs the signal to the logic circuit 35A and the control signal receiver portion 36. In addition, when receiving the multi-value signal of the multi-value number $2^a$ from the multi-value receiver circuit 31, the voltage detecting and control apparatus 39A detects a first detection voltage, a second detection voltage, . . . , a $2^a$-th detection voltage from the electrical potential level of the reception signal. Further, when receiving the multi-value signal of the multi-value number $2^{aN}$ from the multi-value receiver circuit 31, the voltage detecting and control apparatus 39A generates threshold level setting signals RS that respectively indicate the first detection voltage, the second detection voltage, . . . , the $2^a$-th detection voltage, and performs setting so that the voltages applied to the inverted input terminals of the comparators 32-1, . . . , 32-($2^{aN-1}$), . . . , 32-($2^{aN}$-1) become the first detection voltage, the second detection voltage, . . . , the $2^a$-th detection voltage by varying the variable resistors VR1, . . . , VR($2^{aN}$-1) corresponding to the first detection voltage, the second detection voltage, . . . , the $2^a$-th detection voltage.

The transmission system including the transmitter apparatus 1A, the transmission line 2, and the receiver apparatus 3E, as configured above, has the same operational effects as those of the transmission system of the second embodiment.

Third Embodiment

Figure 4:
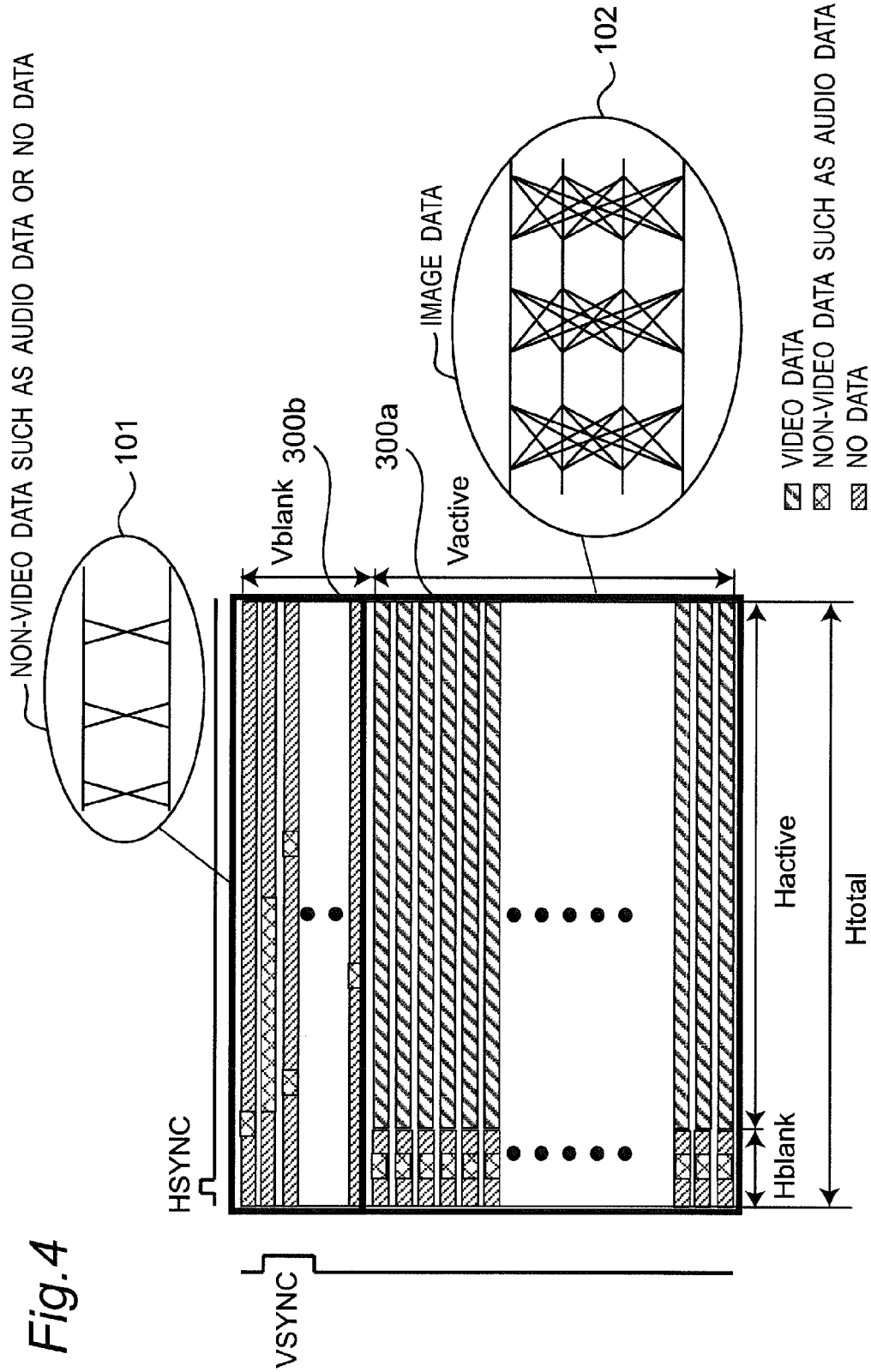
FIG. 4 is a graph showing a frame format of transmission data according to a third embodiment of the present disclosure.

FIG. 4 is a graph showing a frame format of transmission data according to a third embodiment of the present disclosure. In FIG. 4, it is characterized in that a transmission signal of a small multi-value number is transmitted in a vertical blanking time interval 300b that is a part of the blanking time interval, and a transmission signal of a multi-value number larger than the multi-value number in the vertical blanking time interval 300b is transmitted in a time interval 300a other than the vertical blanking time interval 300b.

Figure 5A:
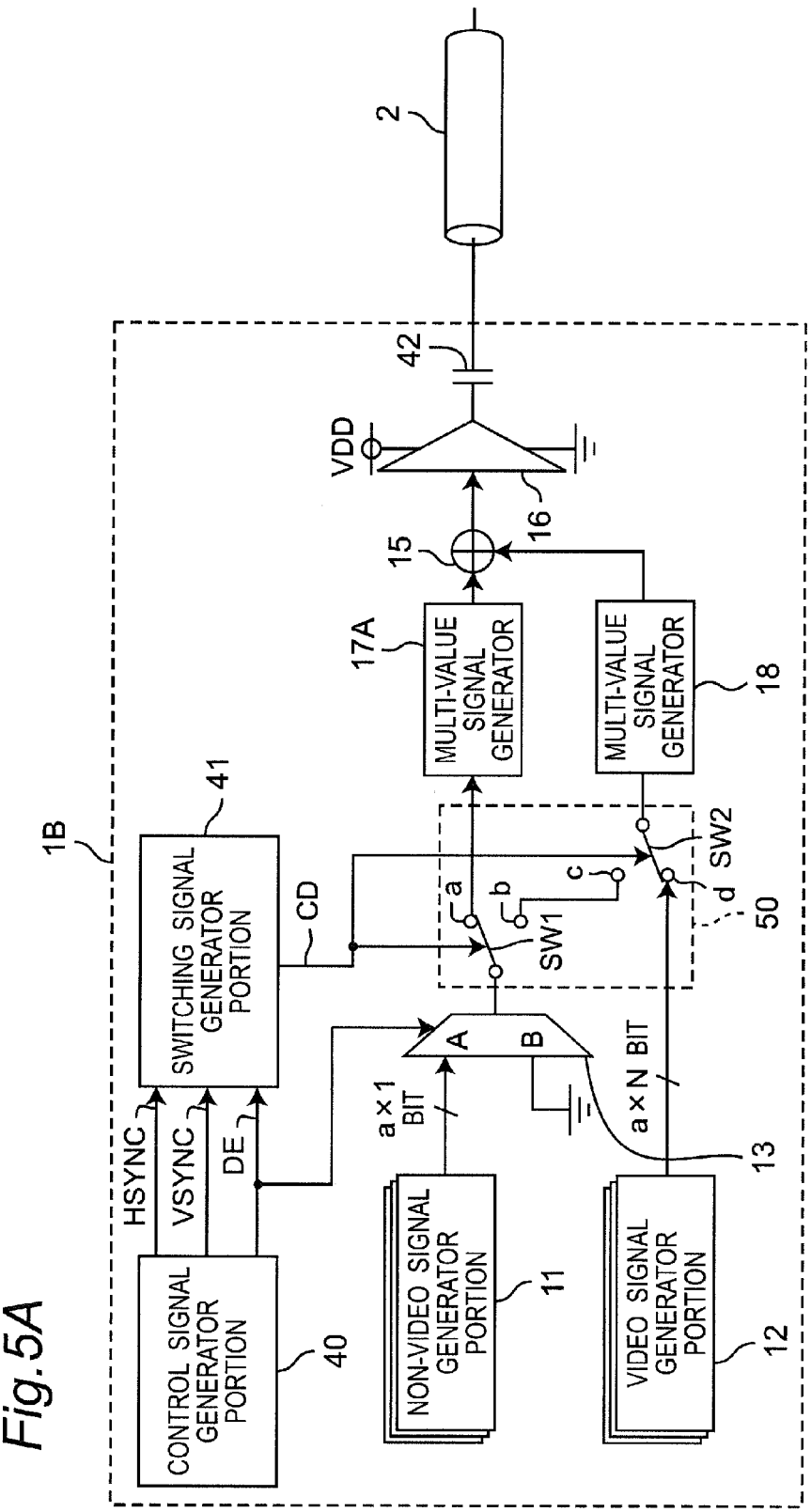
FIG. 5A is a block diagram showing a configuration of a transmitter apparatus 1B of a transmission system that uses a multi-value amplitude modulation system according to the third embodiment of the present disclosure.

FIG. 5A is a block diagram showing a configuration of a transmitter apparatus 1B of a transmission system that uses a multi-value amplitude modulation system according to the third embodiment of the present disclosure. The transmitter apparatus 1B shown in FIG. 5A differs from the transmitter apparatus 1A of the second embodiment shown in FIG. 3A in the following points.

(1) A control signal generator portion 40 of FIG. 5A is provided in place of the control signal generator portion 14.

(2) A switching signal generator portion 41, a coupling capacitor 42 and a switching circuit 50 of FIG. 5A are further provided. In this case, the switching circuit 50 is configured to include a switch SW1 and a switch SW2. In addition, the coupling capacitor 42 is provided to cut off the DC component between the transmission driver circuit 16 and the transmission line 2.

In FIG. 5A, the control signal generator portion 40 generates a horizontal synchronization signal HSYNC, a vertical synchronization signal VSYNC and a control signal DE, and outputs them to the switching signal generator portion 41. The switching signal generator portion 41 has a counter (not shown) for judging whether it is the vertical blanking time interval 300b or the other time interval 300a by clock-counting on the basis of the horizontal synchronization signal HSYNC, the vertical synchronization signal VSYNC and the control signal DE. In this case, the switching signal generator portion 41 generates a switching signal CD to designate the time interval whether (A) the transmission signal of the non-video signal is transmitted with the multi-value signal of the multi-value number $2^a$ in the vertical blanking time interval 300b or (B) the transmission signal of the non-video signal is transmitted with the multi-value signal of the multi-value number $2^{aN}$ in the time interval 300a other than the vertical blanking time interval 300b, and to designate the time interval whether or not (C) the transmission signal of the video signal is transmitted with the multi-value signal of the multi-value number $2^{aN}$ in the above time interval 300a.

The switching signal generator portion 41 outputs the switching signal CD to the switch SW1 and the switch SW2 of the switching circuit 50.

When the non-video signal is transmitted with the multi-value signal of the multi-value number $2^a$ in the vertical blanking time interval 300b, the switch SW1 is switched to the contact point "a" and the switch SW2 is switched to the contact point "d" on the basis of the switching signal CD. On the other hand, when the non-video signal is transmitted with the multi-value signal of the multi-value number $2^{aN}$ in the time interval 300a other than the vertical blanking time interval 300b, the switch SW1 is switched to the contact point "b" and the switch SW2 is switched to the contact point "c" on the basis of the switching signal CD. Further, when the video signal is transmitted with the multi-value signal of the multi-value number $2^{aN}$ in the above time interval 300a, the switch SW2 is switched to the contact point "d" on the basis of the switching signal CD.

Figure 5B:
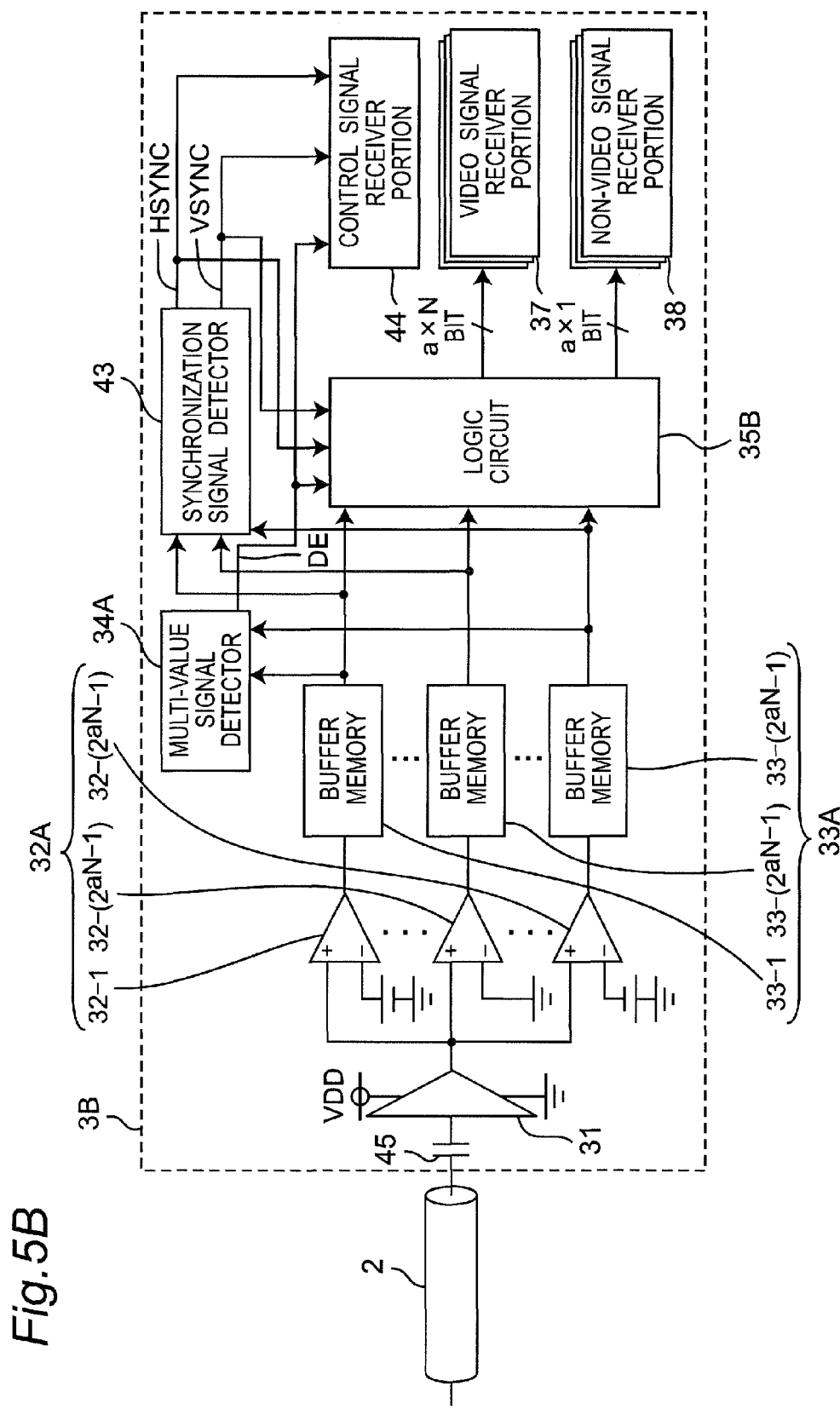
FIG. 5B is a block diagram showing a configuration of a receiver apparatus 3B of the transmission system that uses the multi-value amplitude modulation system of the third embodiment of the present disclosure.

FIG. 5B is a block diagram showing a configuration of a receiver apparatus 3B of the transmission system that uses the multi-value amplitude modulation system of the third embodiment of the present disclosure. The receiver apparatus 3B shown in FIG. 5B differs from the receiver apparatus 3A shown in FIG. 3B in the following points.

(1) A coupling capacitor 45 to cut off the DC component is further provided between the transmission line 2 and the multi-value receiver circuit 31.

(2) A synchronization signal detector 43 is further provided.

(3) A logic circuit 35B of FIG. 5B is provided in place of the logic circuit 35A.

(4) A control signal receiver portion 44 of FIG. 5B is provided in place of the control signal receiver portion 36.

In FIG. 5B, the synchronization signal detector 43 detects the horizontal synchronization signal HSYNC or the vertical synchronization signal VSYNC by judging whether or not the signal pattern of the horizontal synchronization signal HSYNC or the signal pattern of the vertical synchronization signal VSYNC is included on the basis of output signal that has been outputted from the comparator circuit 32A and temporarily stored in the buffer memories 33-1, ..., 33-($2^{aN-1}$), 33-($2^{aN}-1$), and outputs the detected horizontal synchronization signal HSYNC or the vertical synchronization signal VSYNC to the logic circuit 35B and the control signal receiver portion 44. In addition, the multi-value signal detector 34A generates a control signal DE and outputs the signal to the logic circuit 35B and the control signal receiver portion 44 in a manner similar to that of the second embodiment. The logic circuit 35B judges whether it is the vertical blanking time interval 300b or the time interval 300a other than the vertical blanking time interval 300b on the basis of the horizontal synchronization signal HSYNC and the vertical synchronization signal VSYNC, demodulates the multi-value signal of the multi-value number $2^a$ of the reception signal into a non-video signal of a×1 bits in the vertical blanking time interval 300b and demodulates the multi-value signal of the multi-value number $2^{aN}$ into a video signal of a×N bits in the time interval 300a other than the vertical blanking time interval 300b in accordance with the judgment result, and outputs the demodulated non-video signal of a×1 bits and the demodulated video signal of a×N bits to the video signal receiver portion 37 and the non-video signal receiver portion 38.

The operational effects of the transmission system including the transmitter apparatus 1B, the transmission line 2, and the receiver apparatus 3B, as configured above, are described as follows.

The transmitter apparatus 1B of the present embodiment is characterized in that the switching signal CD to designate the vertical blanking time interval 300b, in which only part of the non-video signal is transmitted with the multi-value signal of the small multi-value number, and the time interval 300a other than it is generated by the switching signal generator portion 41 on the basis of the horizontal synchronization signal HSYNC, the vertical synchronization signal VSYNC and the control signal DE, and the non-video signal is transmitted by varying the multi-value number dividedly in the vertical blanking time interval 300b and the other time interval 300a on the basis of the switching signal CD. Therefore, the non-video signal can be transmitted by using the multi-value signal of the large multi-value number without changing the fundamental frequency by transmitting the multi-value signal of the multi-value number $2^{aN}$ in the above time interval 300a, and the non-video signal can be transmitted with the multi-value signal of the multi-value number $2^a$ in the vertical blanking time interval 300b. Therefore, it is possible to reduce the power consumption of the transmission system and suppress the heat generation of the transmitter and receiver apparatuses as compared with the conventional transmission system.

In addition, according to the transmission system of the present embodiment, data processing in units of bits becomes possible by superimposing the video signal and the non-video signal of "a" frames in a manner similar to that of the second embodiment, and therefore, it is possible to simultaneously transmit and receive the video signal and the non-video signal of a plurality of frames at a time without changing the frame format of FIG. 1. In addition, if the transmission signal is transmitted by using the multi-value signal of the multi-value number $2^{4N}$ at the time of Full HD transmission, it is possible to perform 4K2K transmission with the same frame format and the same transmission rate.

Further, according to the transmission system of the present embodiment, the control signal DE, the vertical synchronization signal VSYNC and the horizontal synchronization signal HSYNC can be detected on the basis of the output signal outputted from the comparator circuit 32A. Therefore, for example, a time interval, in which binary value transmission can be performed, can be arbitrarily set by referring to these signals, and therefore, it is possible to easily apply the blanking time interval reduction technique of the prior art binary value transmission. Furthermore, a stable ground level is achieved by putting the central level of the threshold level into a floating state with the coupling capacitors 42 and 45 inserted, and therefore, it is possible to easily perform a determination of the central level with a high degree of accuracy.

The case where the coupling capacitors 42 and 45 are inserted has been described in the above embodiment. However, the embodiment of the present disclosure is not limited thereto. The transmission signal may be transmitted in a DC coupling state without inserting these coupling capacitors 42 and 45.

Fourth Embodiment

Figure 6A:
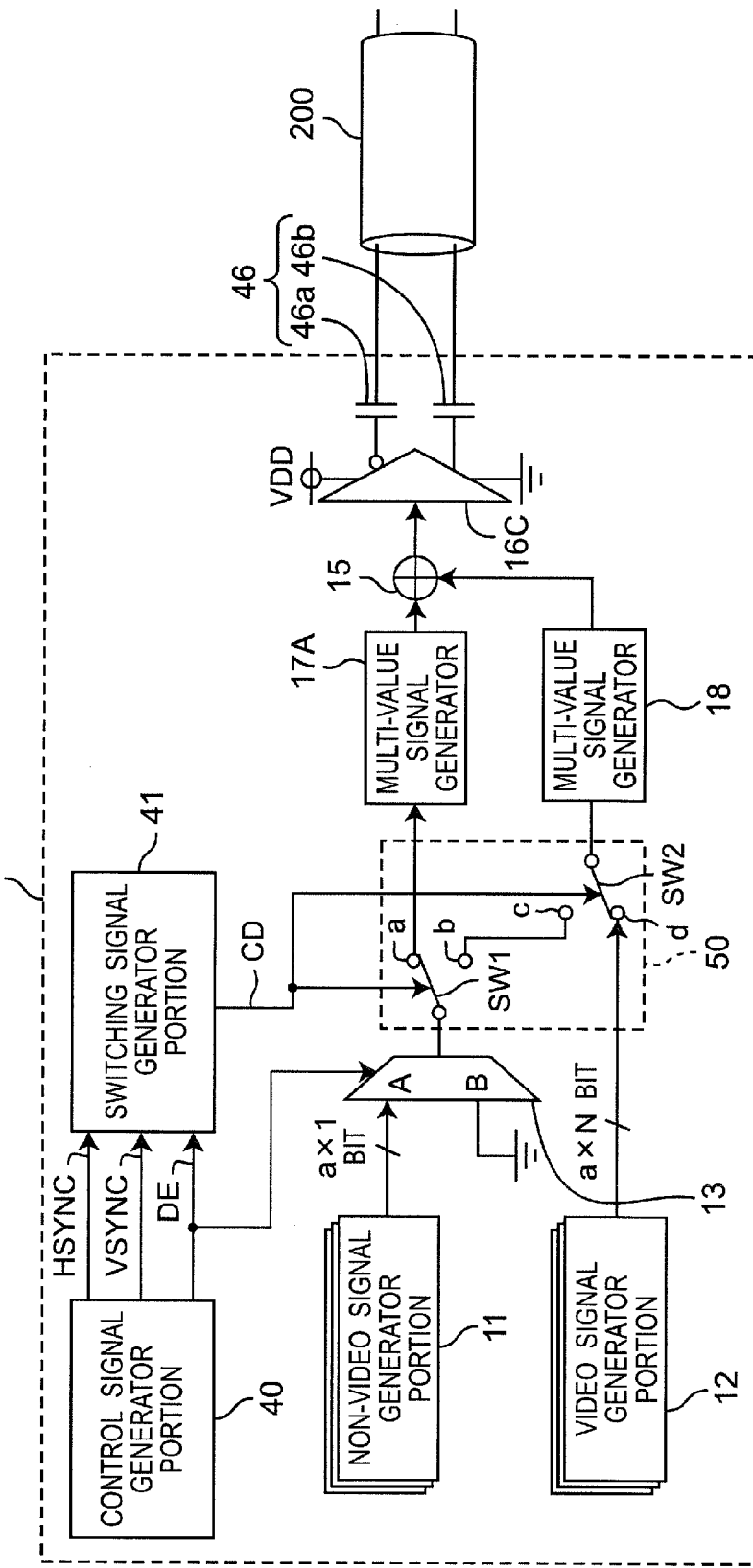
FIG. 6A is a block diagram showing a configuration of a transmitter apparatus 1C of a transmission system that uses a multi-value amplitude modulation system according to a fourth embodiment of the present disclosure.

FIG. 6A is a block diagram showing a configuration of a transmitter apparatus 1C of a transmission system that uses a multi-value amplitude modulation system according to a fourth embodiment of the present disclosure. The transmitter apparatus 10 shown in FIG. 6A differs from the transmitter apparatus 1B shown in FIG. 5A in the following points.

(1) A differential transmission driver circuit 16C of FIG. 6A is provided in place of the transmission driver circuit 16.

(2) The capacitor circuit 46 of FIG. 6A is provided in place of the coupling capacitor 42. In this case, the capacitor circuit 46 is configured to include a coupling capacitor 46a and a coupling capacitor 46b.

(3) A differential transmission line 200 of FIG. 6A is provided in place of the transmission line 2.

In FIG. 6A, the differential transmission driver circuit 16C performs buffer-amplification of a signal of the addition result outputted from the adder 15 without changing the amplitude level of the signal of the addition result, and outputs the signal of the addition result as a transmission signal to the differential transmission line 200 via the coupling capacitors 46a and 46b.

Figure 6B:
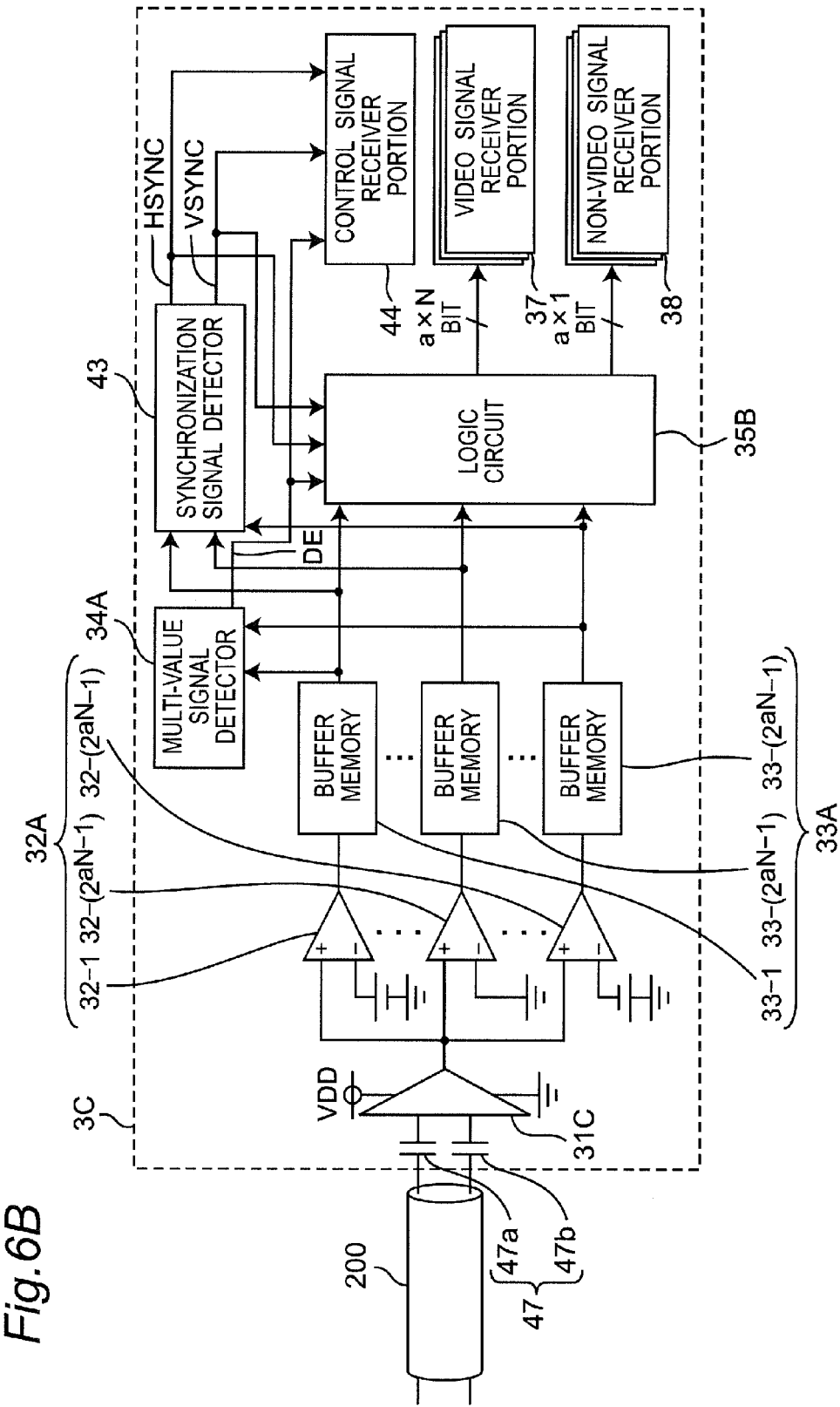
FIG. 6B is a block diagram showing a configuration of a receiver apparatus 3C of the transmission system that uses the multi-value amplitude modulation system of the fourth embodiment of the present disclosure.

FIG. 6B is a block diagram showing a configuration of a receiver apparatus 3C of the transmission system that uses the multi-value amplitude modulation system of the fourth embodiment of the present disclosure. The receiver apparatus 3C shown in FIG. 6B differs from the transmitter apparatus 3B shown in FIG. 5B in the following points.

(1) A differential multi-value receiver circuit 31C of FIG. 6B is provided in place of the multi-value receiver circuit 31A.

(2) The capacitor circuit 47 of FIG. 6B is provided in place of the capacitor 45. In this case, the capacitor circuit 47 is configured to include a coupling capacitor 47a and a coupling capacitor 47b.

In FIG. 6B, the differential multi-value receiver circuit 31C receives the transmission signal received from the differential transmission line 200 via the capacitor circuit 47, performs buffer-amplification without changing the amplitude level of the transmission signal, and outputs the signal as a reception signal to the comparators 32-1, 32-($2^{aN-1}$), ..., 32-($2^{aN}$-1).

The operational effects of the transmission system including the transmitter apparatus 1C, the transmission line 200, and the receiver apparatus 3, as configured above, are described as follows.

The transmission system of the present embodiment includes the differential transmission driver circuit 16C and the differential multi-value receiver circuit 31C. Therefore, it is possible to transmit the video signal and the non-video signal by a differential transmission system, and therefore, it is possible to allow the high-speed transmission to be easier and have reduced noise and high noise tolerance.

The case where the capacitor circuits 46 and 47 are inserted has been described in the above embodiment. However, the embodiment of the present disclosure is not limited thereto. The transmission signal may be transmitted in a DC coupling state without inserting these capacitor circuits 46 and 47

The comparator circuits 32 and 32A use the plurality of threshold levels that are the predetermined reference voltages and generated in the receiver apparatuses 3, 3A, 3B and 3C for the comparing in FIG. 2C, FIG. 3B, FIG. 5B and FIG. 6B in the above embodiments. However, the embodiment of the present disclosure is not limited thereto. A plurality of voltage levels of the received non-video signal in the time interval other than the active time interval detected on the basis of the control signal DE generated in the multi-value signal detectors 34 and 34A may be used as the above plurality of threshold levels.

Modified Embodiment of First Embodiment

FIG. 7 is a transmission waveform chart of a transmission signal of a non-video signal obtained by 4-value conversion and a video signal obtained by 8-value conversion of a transmitter apparatus according to a modified embodiment of the present disclosure. The transmitter apparatus to transmit the transmission waveform chart of the transmission signal as shown in FIG. 7 differs from the transmitter apparatus 1 of FIG. 2A of the first embodiment in the following points.

(1) It is characterized in that the video signal to be transmitted in the active time interval is transmitted by an 8-valued signal that has any of eight electrical potential levels of +3.5 V, +2.5 V, +1.5 V, +0.5 V, −0.5 V, −1.5 V, −2.5 V and −3.5 V instead of transmitting the signal by a 4-value signal that has any of four electrical potential levels of +1.5 V, +0.5 V, −0.5 V and −1.5 V. Therefore, threshold levels V11, V12, V13, V14, V15, V16 and V17 for determining the electrical potential level of the 8-valued signal are set increased by four from the threshold levels V1, V2, V3 and V4 for determining the electrical potential level of the 4-value signal.

(2) It is characterized in that the non-video signal to be transmitted in the blanking time interval is transmitted alternately by a 4-value signal that has an electrical potential level of any of four electrical potential levels of ±3.0 V and ±1.0 V and a 4-value signal that has an electrical potential level of any of four electrical potential levels of ±2.0 V and ±1.0 V instead of transmitting the signal by the binary signal that has the electrical potential level of either +1.0 V and −1.0 V. With this arrangement, the threshold levels V11, V12, V13, V14, V15, V16 and V17 described in the item (1) can be set to be identical to the signal levels of ±3.0 V, ±2.0 V and ±1.0 V of the non-video signal transmitted in the blanking time interval except for the threshold level V14=0 V.

Therefore, the transmitter apparatus of the above modified embodiment is characterized by having the following configuration as compared with the transmitter apparatus 1 of the first embodiment.

(1) A non-video signal generator portion that generates a non-video signal of a plurality of bits is provided in place of the non-video signal generator portion 11 that generates the 1-bit non-video signal.

(2) A control part for switchover of the non-video signal to be transmitted in the blanking time interval between conversion into the 4-value signal that has an electrical potential level of any of the four electrical potential levels of ±3.0 V and ±1.0 V and conversion into the 4-value signal that has an electrical potential level of any of the four electrical potential levels of ±2.0 V and ±1.0 V is provided.

It is noted that the other configurations are similar to those of the first embodiment, and the above modified embodiment has the same operational effects as those of the first embodiment.

In addition, the 4-value signal is transmitted as the transmission signal in the blanking time interval and the 8-valued signal is transmitted as the transmission signal in the active time interval in the above modified embodiment. However, as shown in FIG. 4 of the third embodiment, the 4-value signal may be transmitted as a transmission signal in the vertical blanking time interval 300b, and the 8-valued signal may be transmitted as a transmission signal in the time interval 300a other than the vertical blanking time interval 300b. In this case, the modified embodiment of the first embodiment has the same operational effects as those of the third embodiment.

Modified Embodiments

In the transmission system as configured above, the transmission system, in which the multi-value signal obtained by converting the video signal of natural number "a"×1 bits into the multi-value number $2^a$ is transmitted as the transmission signal has been described. However, the present disclosure is not limited to the above embodiment. For example, as a modified embodiment of the above embodiment, the present disclosure can be applied to a transmission system, in which a non-video signal of natural number M bits is transmitted. That is, the present disclosure can be applied to a transmission system, in which a multi-value signal obtained by converting a non-video signal of a×M bits into a multi-value number $2^{aM}$ is transmitted as a transmission signal. In the above embodiment and modified embodiment, there is video transmission of which the video format is not changed, and the above natural numbers a, N and M are constants, respectively.

As described above, the transmitter apparatus of the first aspect is configured to transmit a non-video signal of natural number "a"×natural number M bits and a video signal of "a"×natural number N bits by the multi-value signal converted into a multi-value number equal to or more than a binary value as a transmission signal in an active time interval including video data or a blanking time interval including data other than the video data. The transmitter apparatus includes a first multi-value signal generator to convert the non-video signal into a multi-value signal of a multi-value number $2^{aM}$ and to output a resulting signal and a second multi-value signal generator to convert the video signal into a multi-value signal of a multi-value number $2^{aN}$ and to output a resulting signal. In addition, the transmitter apparatus includes a transmission driver circuit to transmit the multi-value signal of the multi-value number $2^{aM}$ and the multi-value signal of the multi-value number $2^{aN}$ as transmission signals and the multi-value number $2^{aM}$ of the non-video signal being set smaller than the multi-value number $2^{aN}$ of the video signal.

According to the transmitter apparatus of the first aspect, it is possible to transmit the multi-value signal of the multi-value number $2^{aN}$ in the active time interval by using the large multi-value signal without changing the fundamental frequency, and to transmit the multi-value signal of the multi-value number $2^{aM}$ in the blanking time interval. Therefore, it is possible to reduce the power consumption of the transmission system and suppress the heat generation of the transmitter and receiver apparatuses as compared with the conventional transmission system. In addition, it is possible to perform data processing in units of bits by superimposing the video signal and the non-video signal of a plurality of frames, and therefore, it is possible to simultaneously transmit and receive the video signal and the non-video signal of the plurality of frames at a time without changing the frame format of FIG. 1. Further, if the multi-value signal of the multi-value number $2^{4N}$ is transmitted as a transmission signal at the time of Full HD transmission, it is possible to perform 4K2K transmission with the same frame format and the same transmission rate.

According to the transmitter apparatus of the second aspect, in the transmitter apparatus of the first aspect, the transmitter apparatus further includes a control signal generator portion to generate a control signal indicating one of the blanking time interval and the active time interval and to output the signal.

According to the transmitter apparatus of the second aspect, it is possible to transmit the multi-value signal of the multi-value number $2^{aN}$ in the active time interval by using the large multi-value signal without changing the fundamental frequency, and to transmit the multi-value signal of the multi-value number $2^{aM}$ in the blanking time interval. Therefore, it is possible to reduce the power consumption of the transmission system and suppress the heat generation of the transmitter and receiver apparatuses as compared with the conventional transmission system.

According to the transmitter apparatus of the third aspect, in the transmitter apparatus of the first aspect, each electrical potential level of the transmission signal in the blanking time interval is set to be identical to each threshold level to determine each electrical potential level of the transmission signal in the active time interval.

According to the transmitter apparatus of the third aspect, the transmitter apparatus is set so that the electrical potential level of the transmission signal in the blanking time interval becomes identical to the threshold level to determine the electrical potential level of the transmission signal in the active time interval. Therefore, it is possible to unerringly follow the electrical potential level of the multi-value signal that varies due to differences in the voltage level and the reference voltage between the transmitter apparatus and the receiver apparatus, a temperature change, a loss in the transmission line and so on and to determine the electrical potential level of the multi-value signal with high accuracy, and therefore, it is possible to accurately perform data reception of the multi-value signal in the active time interval.

According to the transmitter apparatus of the fourth aspect, in the transmitter apparatus of the second or third aspect, the transmitter apparatus transmits the non-video signal with the multi-value signal of the multi-value number $2^{aM}$ in the blanking time interval and transmits the video signal with the multi-value signal of the multi-value number $2^{aN}$ in the active time interval on the basis of the control signal.

According to the transmitter apparatus of the fourth aspect, it is possible to transmit the multi-value signal of the multi-value number $2^{aN}$ in the active time interval by using the large multi-value signal without changing the fundamental frequency, and to transmit the multi-value signal of the multi-value number $2^{aM}$ in the blanking time interval. Therefore, it is possible to reduce the power consumption of the transmission system and suppress the heat generation of the transmitter and receiver apparatuses as compared with the conventional transmission system.

According to the transmitter apparatus of the fifth aspect, in the transmitter apparatus of the second or third aspect, the control signal generator portion further generates a horizontal synchronization signal and a vertical synchronization signal. The transmitter apparatus includes a switching signal generator portion to generate a switching signal indicating whether it is the vertical blanking time interval or the interval other than the vertical blanking time interval and to output the signal. The transmitter apparatus transmits the non-video signal with the multi-value signal of the multi-value number $2^{aM}$ in the vertical blanking time interval or with the multi-value signal of the multi-value number $2^{aN}$ in the time interval other than the vertical blanking time interval, and transmits the video signal with the multi-value signal of the multi-value number $2^{aN}$ in the active time interval on the basis of the switching signal.

That is, the transmission driver circuit of the transmitter apparatus transmits the multi-value signal of the multi-value number $2^{aM}$ in at least partial time interval of the blanking time interval and transmits the multi-value signal of the multi-value number $2^{aN}$ in the active time interval.

According to the transmitter apparatus of the fifth aspect, it is possible to transmit the non-video signal by using the multi-value signal of the large multi-value number without changing the fundamental frequency by transmitting the multi-value signal of the multi-value number $2^{aN}$ in the time interval other than the vertical blanking time interval, and to transmit the non-video signal with the multi-value signal of the multi-value number $2^{aM}$ in the vertical blanking time interval. Therefore, it is possible to easily apply the blanking time interval reduction technique of the prior art technology.

According to the transmitter apparatus of the sixth aspect, in the transmitter apparatus of any one of the first to sixth aspects, the transmitter apparatus further includes a coupling capacitor to cut off the DC component of the transmission signal.

According to the transmitter apparatus of the sixth aspect, a stable ground level is achieved by putting the central level of the threshold level into a floating state, and therefore, it is possible to easily perform a determination of the central level with a high degree of accuracy.

According to the transmitter apparatus of the seventh aspect, in the transmitter apparatus of any one of the first to sixth aspects, the transmission driver circuit is a differential transmission driver circuit.

According to the transmitter apparatus of the seventh aspect, the video signal and the non-video signal can be transmitted by a differential transmission system, and therefore, it is possible to make high-speed transmission to be easier and have reduced noise and high noise tolerance.

According to the receiver apparatus of the eighth aspect, receiver apparatus is configured to receive a non-video signal of natural number "a"×natural number M bits and a video signal of "a"×natural number N bits of a transmission signal by the multi-value signal converted into a multi-value number equal or more than a binary value in an active time interval including video data or a blanking time interval including data other than the video data. The receiver apparatus includes a multi-value receiver circuit to receive the transmission signal as a reception signal and to output the signal and a multi-value signal detector to determine whether it is a multi-value signal of a multi-value number $2^{aM}$ or a multi-value signal of a multi-value number $2^{aN}$ from the electrical potential level of the reception signal, and generates a control signal that indicates a determination result. In addition, the receiver apparatus includes a logic circuit to demodulate the multi-value signal of the multi-value number $2^{aM}$ and the multi-value signal of the multi-value number $2^{aN}$ of the reception signal into a non-video signal of a×M bits and a video signal of a×N bits, respectively, on the basis of the electrical potential level of the reception signal and the control signal, and output resulting signals. Further, the receiver apparatus includes the multi-value number $2^{aM}$ of the non-video signal being set smaller than the multi-value number $2^{aN}$ of the video signal.

According to the receiver apparatus of the eighth aspect, determination of the active time interval and the blanking time interval can be made by only the multi-value number of the transmission signal, and therefore, it is possible to eliminate the demodulator circuit as compared with the conventional transmission system.

According to the receiver apparatus of the ninth aspect, in the receiver apparatus of the eighth aspect, the logic circuit demodulates the multi-value signal of the multi-value number $2^{aM}$ of the reception signal into a non-video signal of a×M bits in the blanking time interval and demodulates the multi-value signal of the multi-value number $2^{aN}$ of the reception signal into a video signal of a×N bits in the active time interval on the basis of the control signal.

According to the receiver apparatus of the ninth aspect, it is possible to receive the multi-value signal of the multi-value number $2^{aN}$ in the active time interval, and to receive the multi-value signal of the multi-value number $2^{aM}$ in the blanking time interval. Therefore, it is possible to reduce the power consumption of the transmission system and suppress the heat generation of the transmitter and receiver apparatuses as compared with the conventional transmission system.

According to the receiver apparatus of the tenth aspect is, in the receiver apparatus of the eighth aspect, the receiver apparatus further includes a synchronization signal detector to detect the horizontal synchronization signal or the vertical synchronization signal by determining whether a signal pattern of the horizontal synchronization signal and a signal pattern of the vertical synchronization signal are included on the basis of the electrical potential level of the reception signal, and to output the signal to the logic circuit. In addition, the logic circuit demodulates the multi-value signal of the multi-value number $2^{aM}$ of the reception signal into the non-video signal of a×M bits in the vertical blanking time interval and demodulates the multi-value signal of the multi-value number $2^{aN}$ into the video signal of a×N bits in the time interval other than the vertical blanking time interval depending on whether it is the vertical blanking time interval or the time interval other than the vertical blanking time interval on the basis of the horizontal synchronization signal and the vertical synchronization signal.

According to the receiver apparatus of the tenth aspect, it is possible to demodulate the multi-value signal of the multi-value number $2^{aM}$ of the reception signal into the non-video signal of a×M bits in the vertical blanking time interval and to demodulate the multi-value signal of the multi-value number $2^{aN}$ into the video signal of a×N bits in the time interval other than the vertical blanking time interval, and therefore, it is possible to easily apply the prior art blanking time interval reduction technique.

According to the receiver apparatus of the eleventh aspect, in the receiver apparatus of any one of the eighth to tenth aspects, the receiver apparatus further includes a coupling capacitor to cut off the DC component of the reception signal.

According to the receiver apparatus of the eleventh aspect, it is possible to put the central level of the threshold level into a stable ground level by putting the central level of the threshold level into a floating state, and therefore, it is possible to easily perform a determination of the central level with a high degree of accuracy.

According to the receiver apparatus of the twelfth aspect, in the receiver apparatus of any one of the eighth to eleventh aspects, the multi-value receiver circuit is a differential multi-value receiver circuit.

According to the receiver apparatus of the twelfth aspect, the video signal and the non-video signal can be transmitted by the differential transmission system, and therefore, it is possible to make high-speed transmission easier and have reduced noise and high noise tolerance.

According to the transmission system of the thirteenth aspect, the transmission system includes the transmitter apparatus of the first aspect and the receiver apparatus of the eighth aspect.

According to the transmission system of the thirteenth aspect, it is possible to transmit the multi-value signal of the multi-value number $2^{aN}$ in the active time interval by using the large multi-value signal without changing the fundamental frequency, and to transmit the multi-value signal of the multi-value number $2^{aM}$ in the blanking time interval. Therefore, it is possible to reduce the power consumption of the transmission system and suppress the heat generation of the transmitter and receiver apparatuses as compared with the conventional transmission system. In addition, it is possible to perform data processing in units of bits by superimposing the video signal and the non-video signal of a plurality of frames, and therefore, it is possible to simultaneously transmit and receive the video signal and the non-video signal of the plurality of frames at a time without changing the frame format of FIG. 1. Further, if the multi-value signal of the multi-value number $2^{4N}$ is transmitted as a transmission signal at the time of Full HD transmission, it is possible to perform 4K2K transmission with the same frame format and the same transmission rate.

The invention claimed is:

1. A transmitter apparatus comprising:
a first multi-value signal generator that converts a non-video signal of aM bits equal to "a" multiplied by "M", where "a" and "M" are positive integers, into a multi-value signal of a multi-value number $2^{aM}$, and outputs a resulting signal, the non-video signal being different from a video signal;
a control signal generator that generates a control signal indicating one of a blanking time interval and an active time interval, and outputs the control signal;
a selector that selects one of the non-video signal and a zero signal on the basis of the control signal, and sends the selected signal to the first multi-value signal generator;
a second multi-value signal generator that converts the video signal of aN bits equal to "a" multiplied by "N", where "N" is a positive integer, into a multi-value signal of a multi-value number $2^{aN}$ larger than the multi-value number $2^{aM}$, and outputs a resulting signal;
an adder that adds the resulting signal of the first multi-value signal generator and the resulting signal of the second multi-value signal generator, and outputs a resulting signal; and
a transmission driver circuit that receives the resulting signal output from the adder, transmits the multi-value signal of the multi-value number $2^{aM}$ in at least a partial time interval of the blanking time interval, and transmits the multi-value signal of the multi-value number $2^{aN}$ in the active time interval.

2. The transmitter apparatus as claimed in claim 1, wherein the positive integers "a", "N", and "M" are constant, respectively, in a video transmission without changing a video format.

3. The transmitter apparatus as claimed in claim 1, wherein the transmitter apparatus transmits the non-video signal with the multi-value signal of the multi-value number $2^{aM}$ in the blanking time interval, and transmits the video signal with the multi-value signal of the multi-value number $2^{aN}$ in the active time interval on the basis of the control signal.

4. The transmitter apparatus as claimed in claim 1, wherein the control signal generator further generates a horizontal synchronization signal and a vertical synchronization signal,
the transmitter apparatus includes a switching signal generator that generates a switching signal indicating whether it is the vertical blanking time interval or the interval other than the vertical blanking time interval, and outputs the generated signal, and
the transmitter apparatus transmits the non-video signal with the multi-value signal of the multi-value number $2^{aM}$ in the vertical blanking time interval or with the multi-value signal of the multi-value number $2^{aN}$ in the time interval other than the vertical blanking time interval, and transmits the video signal with the multi-value signal of the multi-value number $2^{aN}$ in the active time interval on the basis of the switching signal.

5. The transmitter apparatus as claimed in claim 1, wherein each electrical potential level of the transmission signal in the blanking time interval is set to be identical to each threshold level to determine each electrical potential level of the transmission signal in the active time interval.

6. The transmitter apparatus as claimed in claim 1, further comprising:
a coupling capacitor that cuts off the DC component of the transmission signal.

7. The transmitter apparatus as claimed in claim 1, wherein the transmission driver circuit is a differential transmission driver circuit.

8. A receiver apparatus comprising:
a multi-value receiver circuit that receives a transmission signal transmitted by converting a non-video signal of aM bits equal to "a" multiplied by "M", where "a" and "M" are positive integers, into a multi-value signal of a multi-value number $2^{aM}$ in a blanking time interval, the non-video signal being different from a video signal, receives a transmission signal transmitted by converting the video signal of aN bits to "a" multiplied by "N", where "N" is a positive integer, into a multi-value signal of a multi-value number $2^{aN}$ larger than the multi-value number $2^{aM}$ in an active time interval, and outputs the received signal as a reception signal;
a comparator circuit that compares an electrical potential level of the reception signal with a plurality of threshold levels, and outputs resulting signals;
a buffer memory circuit that temporarily stores the resulting signals of the comparator circuit;
a multi-value signal detector that determines whether it is a multi-value signal of a multi-value number $2^{aM}$ or a multi-value signal of a multi-value number $2^{aN}$ from the electrical potential level of the reception signal, and generates a control signal that indicates a determination result; and
a logic circuit that demodulates the multi-value signal of the multi-value number $2^{aM}$ and the multi-value signal of the multi-value number $2^{aN}$ of the reception signal into the non-video signal of aM bits and the video signal of aN bits, respectively, on the basis of the electrical potential level of the reception signal and the control signal, and outputs a resulting signal.

9. The receiver apparatus as claimed in claim 8, wherein the positive integers "a", "N", and "M" are constant, respectively, in a video transmission without changing a video format.

10. The receiver apparatus as claimed in claim 8, wherein the logic circuit demodulates the multi-value signal of the multi-value number $2^{aM}$ of the reception signal into the non-video signal of aM bits in the blanking time interval, and demodulates the multi-value signal of the multi-value number $2^{aN}$ of the reception signal into the video signal of aN bits in the active time interval.

11. The receiver apparatus as claimed in claim 8, further comprising:
a synchronization signal detector that detects the horizontal synchronization signal or the vertical synchronization signal by determining whether a signal pattern of the horizontal synchronization signal and a signal pattern of the vertical synchronization signal are included on the basis of the electrical potential level of the reception signal, and outputs the signal to the logic circuit,
wherein the logic circuit demodulates the multi-value signal of the multi-value number $2^{aM}$ of the reception signal into the non-video signal of aM bits in the vertical blanking time interval, and demodulates the multi-value signal of the multi-value number $2^{aN}$ into the video signal of aN bits in the time interval other than the vertical blanking time interval depending on whether it is the vertical blanking time interval or the time interval other than the vertical blanking time interval on the basis of the horizontal synchronization signal and the vertical synchronization signal.

12. The receiver apparatus as claimed in claim 8, further comprising: a coupling capacitor that cuts off the DC component of the reception signal.

13. The receiver apparatus as claimed in claim 8, wherein the multi-value receiver circuit is a differential multi-value receiver circuit.

14. A transmission system comprising:
a transmission apparatus; and
a receiver apparatus,
wherein the transmitter apparatus comprises:
  a first multi-value signal generator that converts the non-video signal of aM bits equal to "a" multiplied by "M", where "a" and "M" are positive integers, into a multi-value signal of a multi-value number $2^{aM}$, and outputs a resulting signal, the non-video signal being different from a video signal;
  a control signal generator that generates a control signal indicating one of a blanking time interval and an active time interval, and outputs the control signal;
  a selector that selects one of the non-video signal and a zero signal on the basis of the control signal, and sends the selected signal to the first multi-value signal generator;
  a second multi-value signal generator that converts the video signal of aN bits equal to "a" multiplied by "N", where "N" is a positive integer, into a multi-value signal of a multi-value number $2^{aN}$ larger than the multi-value number $2^{aM}$, and outputs a resulting signal;
  an adder that adds the resulting signal of the first multi-value signal generator and the resulting signal of the second multi-value signal generator, and outputs a resulting signal; and
  a transmission driver circuit that receives the resulting signal output from the adder, transmits the multi-value signal of the multi-value number $2^{aM}$ in at least a partial time interval of the blanking time interval, and transmits the multi-value signal of the multi-value number $2^{aN}$ in the active time interval, and
wherein the receiver apparatus comprises:
  a multi-value receiver circuit that receives a transmission signal transmitted by converting a non-video signal of aM bits different from a video signal into a multi-value signal of a multi-value number $2^{aM}$ in a blanking time interval, receives a transmission signal transmitted by converting the video signal of aN bits into a multi-value signal of a multi-value number $2^{aN}$ larger than the multi-value number $2^{aM}$ in an active time interval, and outputs the received signal as a reception signal;
  a comparator circuit that compares an electrical potential level of the reception signal with a plurality of threshold levels, and outputs resulting signals;
  a buffer memory circuit that temporarily stores the resulting signals of the comparator circuit;
  a multi-value signal detector that determines whether it is a multi-value signal of a multi-value number $2^{aM}$ or a multi-value signal of a multi-value number $2^{aN}$ from the electrical potential level of the reception signal, and generates a control signal that indicates a determination result; and
  a logic circuit that demodulates the multi-value signal of the multi-value number $2^{aM}$ and the multi-value signal of the multi-value number $2^{aN}$ of the reception signal into the non-video signal of aM bits and the video signal of aN bits, respectively, on the basis of the electrical potential level of the reception signal and the control signal, and outputs a resulting signal.

\* \* \* \* \*